US010165481B2

(12) United States Patent
Gomes et al.

(10) Patent No.: US 10,165,481 B2
(45) Date of Patent: *Dec. 25, 2018

(54) METHOD AND APPARATUS FOR ADDING CSG IDENTITIES TO A WHITE LIST IN CONNECTED MODE

(71) Applicant: InterDigital Patent Holdings, Inc., Wilmington, DE (US)

(72) Inventors: Sylvie Gomes, Manhasset, NY (US); Diana Pani, Montreal (CA); Virgil Comsa, Montreal (CA); Mahmoud Watfa, Saint Leonard (CA); Ulises Olvera-Hernandez, Montreal (CA); Pascal M. Adjakple, Great Neck, NY (US); Catalina M. Mladin, Hatboro, PA (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/255,285

(22) Filed: Sep. 2, 2016

(65) Prior Publication Data

US 2016/0373974 A1 Dec. 22, 2016

Related U.S. Application Data

(63) Continuation of application No. 12/986,961, filed on Jan. 7, 2011, now Pat. No. 9,467,884.

(Continued)

(51) Int. Cl.
*H04W 36/00* (2009.01)
*H04W 36/36* (2009.01)
*H04W 24/10* (2009.01)

(52) U.S. Cl.
CPC ....... *H04W 36/0061* (2013.01); *H04W 24/10* (2013.01); *H04W 36/36* (2013.01)

(58) Field of Classification Search
CPC .. H04W 36/0061; H04W 36/36; H04W 24/10
See application file for complete search history.

(56) References Cited

U.S. PATENT DOCUMENTS

| 5,649,291 A | * | 7/1997 | Tayloe | H04B 7/18541 |
| | | | | 370/332 |
| 6,587,686 B1 | * | 7/2003 | Cuffaro | H04W 24/00 |
| | | | | 370/242 |

(Continued)

FOREIGN PATENT DOCUMENTS

| CN | 101534529 A | 9/2009 |
| CN | 101552954 A | 10/2009 |

(Continued)

OTHER PUBLICATIONS

NTT DOCOMO, Inc., "CSG inbound handover—overview," 3GPP TSG-RAN WG2 #68, R2-096999, Jeju, Korea (Nov. 9-13, 2009).

(Continued)

*Primary Examiner* — Lewis West
(74) *Attorney, Agent, or Firm* — Volpe and Koenig, P.C.

(57) ABSTRACT

A serving eNodeB and a method thereof are provided. The serving eNodeB includes a receiver configured to receive, from a wireless transmit/receive unit (WTRU), a first measurement report including a physical layer cell identity (PCI) of a target closed subscriber group (CSG) cell detected by the WTRU, a transmitter configured to, in response to the received first measurement report, to transmit a message to the WTRU indicating that the WTRU is to read system information (SI) of the target CSG cell, and a processor. The receiver is further configured to, in response to a transmission of the message, receive a second measurement report for the target CSG cell including information read from the SI, and the processor is configured to, in response to receipt of the second measurement report, add the target CSG cell to a cell list and initiate a handover of the WTRU to the target CSG cell.

20 Claims, 10 Drawing Sheets

Related U.S. Application Data

(60) Provisional application No. 61/329,481, filed on Apr. 29, 2010, provisional application No. 61/293,562, filed on Jan. 8, 2010.

(56) References Cited

U.S. PATENT DOCUMENTS

| | | | |
|---|---|---|---|
| 7,738,922 | B2 | 6/2010 | Hashimoto et al. |
| 8,014,376 | B2 | 9/2011 | Kim |
| 8,085,684 | B2* | 12/2011 | Kwon ............... H04W 48/20 370/252 |
| 8,131,295 | B2 | 3/2012 | Wang et al. |
| 8,265,033 | B2* | 9/2012 | Gunnarsson ......... H04J 11/0093 370/331 |
| 8,676,204 | B2 | 3/2014 | Uemura et al. |
| 2006/0111110 | A1 | 5/2006 | Schwarz et al. |
| 2006/0226557 | A1 | 10/2006 | Yamamoto |
| 2007/0097914 | A1 | 5/2007 | Grilli et al. |
| 2009/0047968 | A1 | 2/2009 | Gunnarsson et al. |
| 2009/0082020 | A1 | 3/2009 | Ch'ng et al. |
| 2009/0135787 | A1 | 5/2009 | Uemura et al. |
| 2009/0168727 | A1 | 7/2009 | Somasundaram et al. |
| 2009/0176490 | A1 | 7/2009 | Kazmi et al. |
| 2009/0185524 | A1* | 7/2009 | Sammour ............ H04J 11/0069 370/328 |
| 2009/0239533 | A1 | 9/2009 | Somasundaram et al. |
| 2009/0247186 | A1* | 10/2009 | Ji ............................. G01S 5/02 455/456.1 |
| 2009/0312023 | A1 | 12/2009 | Kazmi |
| 2009/0316595 | A1* | 12/2009 | Kwon ............... H04W 48/20 370/252 |
| 2009/0316654 | A1 | 12/2009 | Prakash et al. |
| 2010/0008259 | A1* | 1/2010 | Yoon ..................... H04W 48/20 370/254 |
| 2010/0093350 | A1* | 4/2010 | Wang .................. H04J 11/0093 455/436 |
| 2011/0092214 | A1 | 4/2011 | Iwamura |
| 2011/0096660 | A1 | 4/2011 | Ikeda et al. |
| 2011/0212729 | A1* | 9/2011 | Li ......................... H04W 48/16 455/450 |
| 2011/0300867 | A1 | 12/2011 | Matsuo et al. |
| 2011/0314162 | A1 | 12/2011 | Xu et al. |
| 2012/0014267 | A1* | 1/2012 | Gomes .............. H04W 36/0088 370/252 |
| 2012/0196593 | A1* | 8/2012 | Jung ..................... H04W 48/10 455/434 |
| 2012/0208556 | A1* | 8/2012 | Jung ..................... H04W 48/16 455/456.1 |

FOREIGN PATENT DOCUMENTS

| | | |
|---|---|---|
| CN | 101583175 A | 11/2009 |
| CN | 101616424 A | 12/2009 |
| JP | 2009-124671 | 6/2009 |
| WO | 07/006228 | 1/2007 |
| WO | 07/103822 | 9/2007 |
| WO | 08/002342 | 1/2008 |
| WO | 08/027946 | 3/2008 |
| WO | 09/044317 | 4/2009 |
| WO | 2009043002 A2 | 4/2009 |
| WO | 09/055841 | 5/2009 |

OTHER PUBLICATIONS

Sesia et al., "LTE—The UMTS Long Term Evolution: From Theory to Practice," John Wiley & Sons, Ltd., 1st edition (2009).
Ericsson, "Automatic neighbour cell configuration," 3GPP TSG RAN WG3 Meeting #57, R3-071494, Athens, Greece (Aug. 20-24, 2007).
Ericsson, "Inter-RAT/Frequency Automatic Neighbor Relation Measurements," 3GPP TSG-RAN WG3 Meeting #59, R3-080420, Sorrento, Italy (Feb. 11-15, 2008).
Huawei, "Measurement Gap scheduling in HO procedure in LTE," 3GPP TSG RAN2 #52, R2-060860 (Mar. 27-31, 2006).
Motorola, "Identification and Measurement of CSG cells," 3GPP TSG-RAN WG2#61, R2-081114 (Feb. 11-15, 2008).
Motorola, "Physical Layer Identity of CSG Cells," 3GPP TSG-RAN WG2 Meeting #60, R2-075088, Jeju, Korea (Nov. 5-9, 2007).
Motorola, "UMTSLTE: Inbound CSG Mobility LTE," R2-094632, 3GPP TSG-RAN WG2 #67, Shenzhen, China, Aug. 24-28, 2009.
Nokia Corporation et al., "CSG Cell Identification for Mobility and Measurement Reporting," 3GPP TSG-RAN W62 Meeting #59bis, R2-074882 (Nov. 5-9, 2007).
Nokia Siemens Networks et al., "Home eNodeB mobility call flows (redux R3-080373)," 3GPP TSG RAN WG3 Meeting #59 bis, R3-080815, Sorrento, Italy (Feb. 11-15, 2008).
Qualcomm Europe, "Measurement gap scheduling," 3GPP TSG-RAN2 Meeting #50, R2-060058 (Jan. 9-13, 2006).
Qualcomm, "UMTSLTE: Inbound CSG Mobility UMTS," R2-094820, 3GPP TSG-RAN WG2 #67, Shenzhen, China, Aug. 24-28, 2009.
Rapporteur Huawei, "Status Report for WI to TSG," TSG-RAN Meeting #45, Seville, Spain, Sep. 15-18, 2009.
Samsung, "Measurement of home & private eNBs," 3GPP TSG-RAN2 Meeting #59, R2-073307, Athens, Greece (Aug. 20-24, 2007).
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.8.0, Dec. 2009.
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.12.0, Dec. 2010.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.1.0, Jan. 2010.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.5.0, Dec. 2010.
Third Generation Partnership Project, "Technical Specification Group Radio Access Network; Evolved Universal Terrestrial Radio Access (E-UTRA) Radio Resource Control (RRC); Protocol Specification (Release 10)," 3GPP TS 36.331 v10.0.0, Dec. 2010.
Third Generation Partnership Project, "Technical Specification Group Radio Access Network; Mobility Procedures for Home NodeB; Overall Description; Stage 2 (Release 8)," 3GPP TS 25.367 v8.3.0, Dec. 2009.
Third Generation Partnership Project, "Technical Specification Group Radio Access Network; Mobility Procedures for Home NodeB; Overall Description; Stage 2 (Release 9)," 3GPP TS 25.367 v9.2.0, Jan. 2010.
Third Generation Partnership Project, "Technical Specification Group Radio Access Network; Mobility Procedures for Home NodeB; Overall Description; Stage 2 (Release 9)," 3GPP TS 25.367 v9.5.0, Dec. 2010.
Third Generation Partnership Project, "Technical Specification Group Radio Access Network; Radio Resource Control (RRC); Protocol Specification (Release 6)," 3GPP TS 25.331 v6.23.0, Sep. 2009.
Third Generation Partnership Project, "Technical Specification Group Radio Access Network; Radio Resource Control (RRC); Protocol Specification (Release 6)," 3GPP TS 25.331 v6.25.0, Apr. 2010.
Third Generation Partnership Project, "Technical Specification Group Radio Access Network; Radio Resource Control (RRC); Protocol Specification (Release 7)," 3GPP TS 25.331 v7.14.0, Sep. 2009.
Third Generation Partnership Project, "Technical Specification Group Radio Access Network; Radio Resource Control (RRC); Protocol Specification (Release 7)," 3GPP TS 25.331 v7.18.0, Oct. 2010.
Third Generation Partnership Project, "Technical Specification Group Radio Access Network; Radio Resource Control (RRC); Protocol Specification (Release 8)," 3GPP TS 25.331 v8.8.0, Sep. 2009.
Third Generation Partnership Project, "Technical Specification Group Radio Access Network; Radio Resource Control (RRC); Protocol Specification (Release 8)," 3GPP TS 25.331 v8.12.0, Oct. 2010.

(56) References Cited

OTHER PUBLICATIONS

Third Generation Partnership Project, "Technical Specification Group Radio Access Network; Radio Resource Control (RRC); Protocol Specification (Release 9)," 3GPP TS 25.331 v9.0.0, Sep. 2009.
Third Generation Partnership Project, "Technical Specification Group Radio Access Network; Radio Resource Control (RRC); Protocol Specification (Release 9)," 3GPP TS 25.331 v9.4.0, Oct. 2010.
Third Generation Partnership Project, "Technical Specification Group Radio Access Network; Radio Resource Control (RRC); Protocol Specification (Release 10)," 3GPP TS 25.331 v10.1.0, Oct. 2010.
Third Generation Partnership Project, "Technical Specification Group Radio Access Network; User Equipment (UE) procedures in idle mode and procedures for cell reselection in connected mode (Release 9)," 3GPP TS 25.304 v9.3.0 (Sep. 2010).
Third Generation Partnership Project, "Technical Specification Group Radio Access Network; User Equipment (UE) procedures in idle mode and procedures for cell reselection in connected mode (Release 9)," 3GPP TS 25.304 v9.0.0 (Dec. 2009).
Third Generation Partnership Project, "Technical Specification Group Radio Access Network; User Equipment (UE) procedures in idle mode and procedures for cell reselection in connected mode (Release 8)," 3GPP TS 25.304 V8.11.0 (Sep. 2010).
Third Generation Partnership Project, "Technical Specification Group Radio Access Network; User Equipment (UE) procedures in idle mode and procedures for cell reselection in connected mode (Release 8)," 3GPP TS 25.304 V8.8.0 (Dec. 2009).
Third Generation Partnership Project, "Technical Specification Group Radio Access Network; Mobility Procedures for Home NodeB; Overall Description; Stage 2 (Release 8)," 3GPP TS 25.367 v8.2.0, Sep. 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.6.0 (Dec. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.8.0 (Dec. 2009).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.9.0 (Sep. 2010).
Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.1.0 (Dec. 2009).
Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.5.0 (Dec. 2010).
Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.0.0 (Dec. 2010).
Third Generation Partnership Project, "Technical Specification Group Services and System Aspects; Architecture aspects of Home NodeB and Home eNodeB (Release 9)," 3GPP TR 23.830 V9.0.0 (Sep. 2009).
Vodafone Group, "Measurement Control in LTE_Active state (for CSG Cells)," 3GPP TSG RAN WG2#58bis, R2-072829, Orlando, Florida, USA (Jun. 25-29, 2007).
Huawei Technologies Co., Ltd. "Validity of CSG information received in idle and connected mode," 3GPP TSG GERAN WG2 #43bis, G2-090155, Sophia Antipolis, France (Oct. 21-23, 2009).
LG Electronics Inc., "Measurement Control and Reporting Method for inbound mobility to CSG cell," 3GPP TSG-GERAN#43, GP-091179, Vancouver, Canada (Aug. 31-Sep. 4, 2009).
Qualcomm Europe, "Connected mode mobility in the presence of PCI confusion," 3GPP TSG-RAN WG3 meeting #63-bis, R3-090699, Seoul, Korea (Mar. 23-27, 2009).
ZTE, "ReportCGI procedure for SI report," TSG TAN WG2 #68, R2-096780, Jeju, Korea (Nov. 9-13, 2009).
Catt, "Access control for inbound handover," 3GPP TSG-RAN WG3 #65, R3-091552, ShenZhen, China (Aug. 24-28, 2009).
Huawei, "Some corrections to 25.367," 3GPP TSG-RAN WG2 Meeting #69bis, R2-102154, Beijing, China (Apr. 12-16, 2010).
Nokia Siemens Networks, "User Consent and Review of White list entries," 3GPP TSG-SA1 #44, S1-090110, San Antonio, Texas, USA (Feb. 2-6, 2009).
NTT DOCOMO, "SI report handling independent of CSG," 3GPP TSG-RAN Meeting #67bis, R2-096013, Miyazaki, Japan (Oct. 12-16, 2009).
Qualcomm Europe, "Connected mode mobility for HeNBs using information in the Mib," 3GPP TSG-RAN WG2 #66bis, R2-093749, Los Angeles, USA (Jun. 29-Jul. 3, 2009).
Qualcomm, "Draft CR capturing HNB inbound mobility agreements. Further revision to capture agreements from RAN2#68," 3GPP TSG-RAN WG2 Meeting #68, R2-097118, Jeju, S. Korea (Nov. 9-13, 2009).

* cited by examiner

METHOD AND APPARATUS FOR ADDING CSG IDENTITIES TO A WHITE LIST IN CONNECTED MODE

CROSS REFERENCE TO RELATED APPLICATIONS

This application is a continuation of U.S. patent application Ser. No. 12/986,961 filed Jan. 7, 2011, which issued on Oct. 11, 2016 as U.S. Pat. No. 9,467,884, which claims the benefit of U.S. Provisional Application No. 61/293,562, filed on Jan. 8, 2010, and U.S. Provisional Application No. 61/329,481, filed on Apr. 29, 2010, the contents of which are hereby incorporated by reference herein.

FIELD OF INVENTION

This application is related to wireless communications.

BACKGROUND

Home Node Bs (HNBs) for Universal Mobile Telecommunications System (UMTS) and Home evolved Node Bs (HeNBs) for Long Term Evolution (LTE), hereinafter, interchangeably referred to as HNBs or HeNBs, have been introduced in LTE to increase the cellular coverage and the overall system throughput. The HNBs may have a dense deployment and may be in the coverage area of one or more macro Node Bs. For example, they may be used in a private house or in a coffee shop. An IDLE mode mobility (IDLE, cell paging channel (CELL_PCH), and URA_PCH for UMTS and IDLE for LTE) has been standardized. Standardizing a connected mode mobility (i.e., handover) for Release 9 has not been completed.

The HNB refers to a physical device that may be similar to a wireless local area network (WLAN) access point (AP). The HNB provides users with access to UMTS and/or LTE services over extremely small service areas, such as homes or small offices. The HNB is intended to connect to the operators' core network by using, for example, an internet connection (e.g., digital subscriber line (DSL)).

A HNB closed subscriber group (CSG) cell is a defined area over which radio coverage provided by the HNB may only be accessed by a group of subscribers authorized to use the services of the cell. The authorized wireless transmit/receive units (WTRUs) are called members of the CSG cell. The CSG may be a family or anyone in the vicinity of a particular location (e.g., anyone in a coffee shop) who attempts to access the HNB CSG cell. The subscriber (i.e., the WTRU) who may be an individual or an organization may deploy a CSG cell using a HNB over an area where such service is desired. Each WTRU stores a list, referred to herein as a white list or allowed list, which includes CSG identities (IDs) of the CSG cells it is authorized to access. A hybrid cell is a cell that works similar to a CSG cell for member WTRUs and similar to an open cell for non-member WTRUs, but may prioritize access for member WTRUs.

In wireless communication systems, various mobile devices, such as cell phones and other user equipment (UE), or a WTRU may be in connection with and served by a base station such as a HNB. A HeNB may serve as a base station/cell and may provide coverage over smaller areas than macro cells may provide in 3G, LTE, or other systems, for example.

FIG. 1 shows an example of a conventional HeNB deployment in a wireless communication system 100. The wireless communication system 100 includes an LTE macro cell 105, a 3GPP system cell 110, a higher network node (e.g., gateway) 115 and/or a mobility management entity (MME)/serving general packet radio service (GPRS) support node (SGSN) 120. The higher network node 115 is responsible for coordinating the operation of several HeNBs 125A, 125B and 125C. Alternatively, the MME/SGSN 120 may be responsible for coordinating the operation of HeNBs 125A, 125B and 125C. The MME is the LTE equivalent of a 3G/2G SGSN. The relationship between the LTE macro cell 105 and the 3GPP system 110, (e.g., wideband code division multiple access (WCDMA)/global system for mobile communications (GSM)), is that there may be areas where the coverage of these two technologies overlap. This overlap in coverage is similar to simultaneous coverage of GSM and WCDMA technologies. The higher network node 115 is likely to be a gateway function which interfaces with the MME/SGSN 120. As a gateway, the role of the higher network node 115 may be to act as a single macro cell towards the MME/SGSN 120 while supporting several small home cells.

FIG. 2 shows an LTE wireless communication system 200 including a WTRU 205, a serving CSG cell 210, and a neighbor CSG cell 215. To complete an inbound handover to a CSG cell in the LTE wireless communication system 200, the WTRU 205 needs to measure and report the CSG cell to the network. However, CSG cells are prone to physical layer cell identity (PCI) confusion, which is when two different CSG cells in the neighborhood of a radio network controller (RNC) or eNB, where the WTRU is initially connected, utilize the same PCI. PCI confusion may also exist if the WTRU has to handover to a CSG cell which it is not a member of (e.g., hybrid cell).

A HeNB may be an open node, a restricted access node, or a hybrid node, among others. A restricted access node HeNB may permit connection with a WTRU that is a member of a CSG of that node. In other words, if a restricted access HeNB node does not recognize the WTRU attempting to connect as a member of the node's CSG, the HeNB may not accept the connection, which may include a handover attempt from another HeNB. As indicated, an example of a restricted access HeNB may be a HeNB that belongs to a CSG. A CSG HeNB may provide access and service to a WTRU on a subscription (or membership) basis. Further, a CSG HeNB may be a CSG cell. A CSG cell may also include a CSG macro cell or CSG macro node B, among others. An open node or open HeNB may be a non-CSG cell.

The hybrid type HeNB may accept a connection with a WTRU that is not an identified member of the CSG to which the hybrid HeNB belongs, but the non-member WTRU connection with the hybrid HeNB may be subject to certain limitations. For example, the hybrid HeNB may deny the non-member WTRU a preferential rate or the non-member WTRU may be preempted before the member WTRU, should the hybrid HeNB need to preempt non-member WTRU due to a quality of service issue. A hybrid HeNB may be a hybrid cell. A hybrid cell may also include a hybrid macro cell or a hybrid node B, and the like.

At times, and for various reasons, a WTRU may need to transfer from one HeNB to another HeNB, or from one cell to another cell. For example, in a handover, a WTRU may replace a connection to one HeNB or cell with a connection to second HeNB cell. If the second HeNB is a CSG cell (or CSG HeNB, close mode cell, or CSG cell), the CSG cell may not accept a connection to a WTRU that the CSG cell does not recognize as a CSG member WTRU. In such situations, the handover may fail. A method and apparatus that allow the WTRU to search and add one or more CSG IDs in the WTRU white list while in connected mode are desired.

SUMMARY

A method and apparatus are provided that allow the WTRU to search and add one or more CSG IDs in the WTRU white list while in connected mode. Such method and apparatus include but are not limited to WTRU autonomous search or a manual search, WTRU initiated procedures, or network initiated procedures. Additionally, methods that allow the network and/or the non-access stratum (NAS) to add CSG IDs are also described.

A method and a WTRU is provided comprising a processor configured to detect a trigger for starting an autonomous CSG cell search for neighboring CSG cells, a transmitter configured to send a message to a network indicating that the autonomous CSG cell search in connected mode has began, a receiver configured to receive a message from the network indicating a request for detecting, measuring, and reporting the neighboring CSG cells, and the processor configured to detect and measuring the neighboring CSG cells.

An MME comprising a processor configured to determine a status of a WTRU relative to a target CSG cell, determine whether the WTRU has transferred from a source home NodeB (HNB) to the target CSG cell, and on a condition that the WTRU has transferred from a source HNB to the target CSG cell, update the source HNB with a current identification of the target CSG cell is provided.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), Home Node B, or any other type of interfacing device capable of operating in a wireless environment.

A HeNB may comprise a processor for processing data and commands, a transmitter for sending information, a receiver for receiving data, and an antenna coupled to the transmitter and the receiver for receiving stat across the wireless interface.

In wireless communication systems, a WTRU may be in connection with an HeNB that provides the WTRU with base station cell coverage. Such an HeNB may be referred to as a source or home HeNB and the source HeNB may be a macro cell node, a CSG cell, or a hybrid node. The wireless communication system may also include one or more a MME and at least one other HeNB or cell.

It is understood that the concepts described herein are also applicable to other wireless technologies such as an UMTS. For the case of UMTS, the equivalent terminology for PCI may be primary scrambling code (PSC).

When referred to hereafter, signal "quality" may refer to a measurement taken by the WTRU that measures the quality of the signal from a cell or that measures the received signal level from a cell. This may correspond to reference signal receive quality (RSRQ) in LTE or common pilot channel (CPICH) Ec/No in UMTS. It may also correspond to reference signal receive power (RSRP) in LTE or CPICH received signal code power (RSCP) in UMTS. When referred to hereafter, CSG ID refers to CSG identity and CGI refers to cell global identity.

Figure 1:
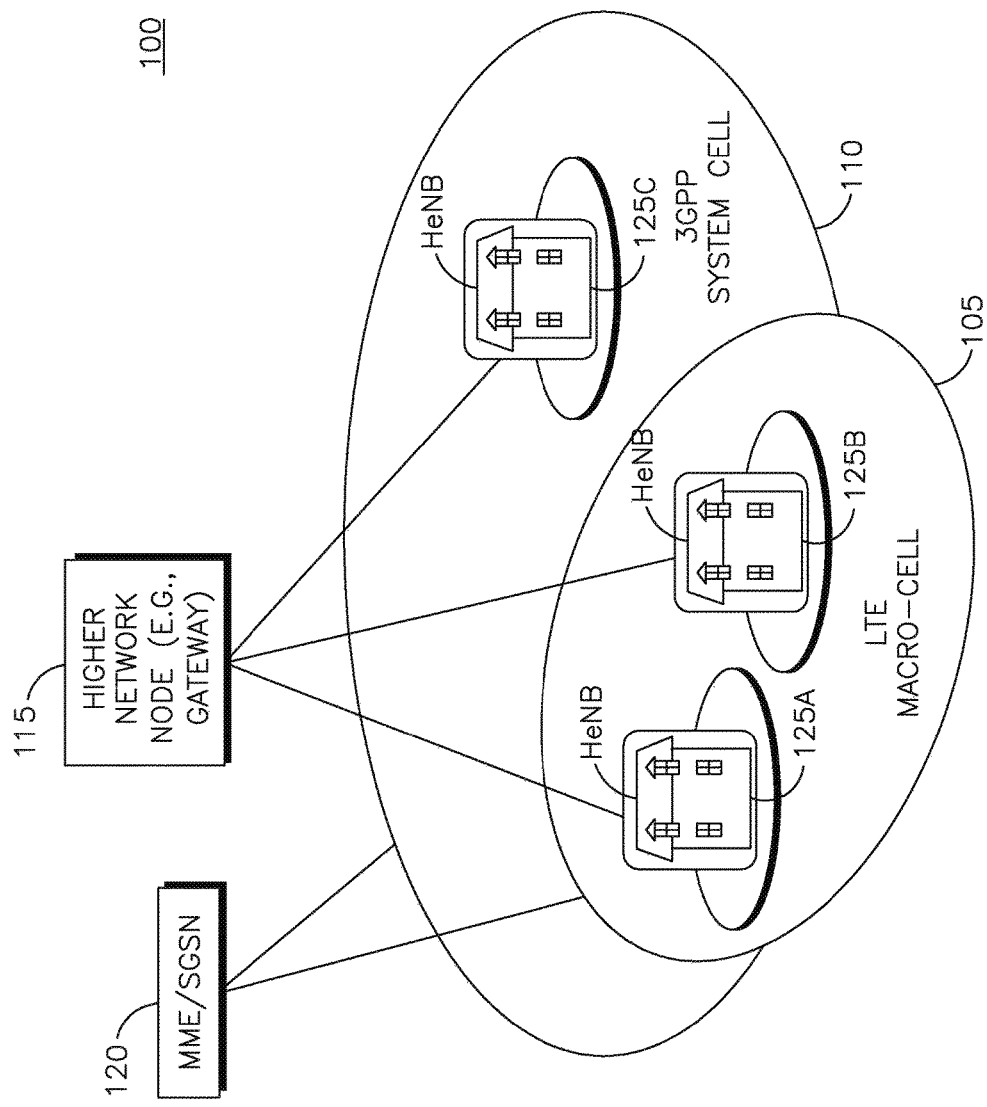
FIG. 1 shows an example of a conventional HeNB deployment in a wireless communication system.
Figure 2:
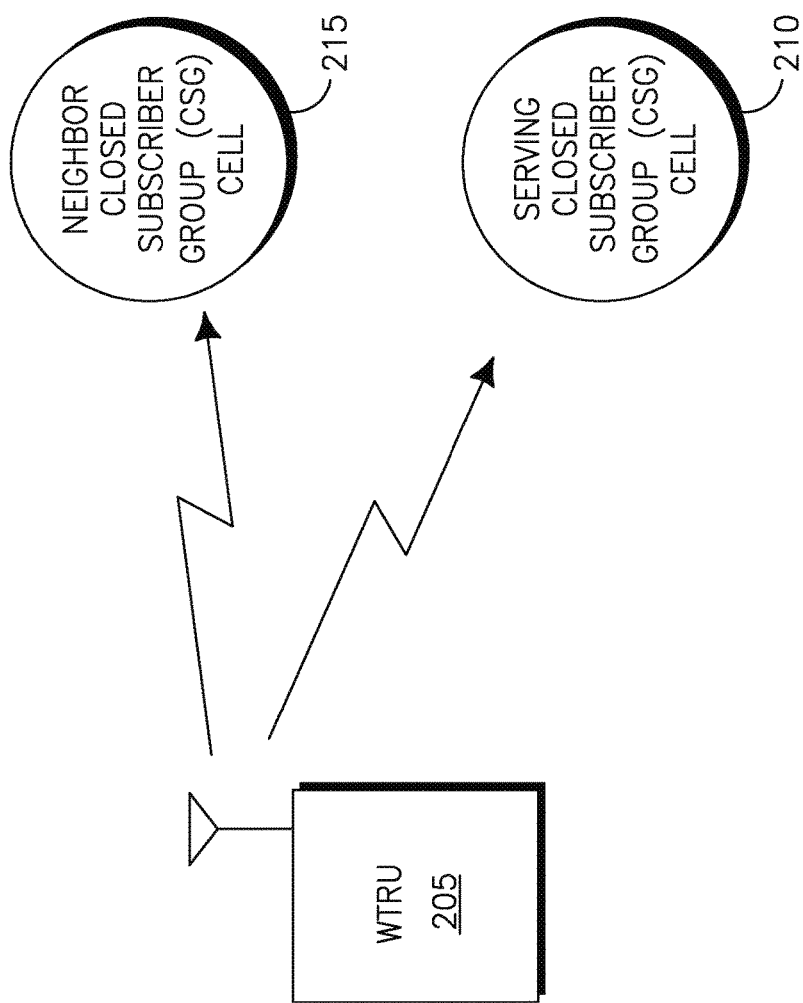
FIG. 2 shows an LTE wireless communication system in accordance with one embodiment.
Figure 3A:
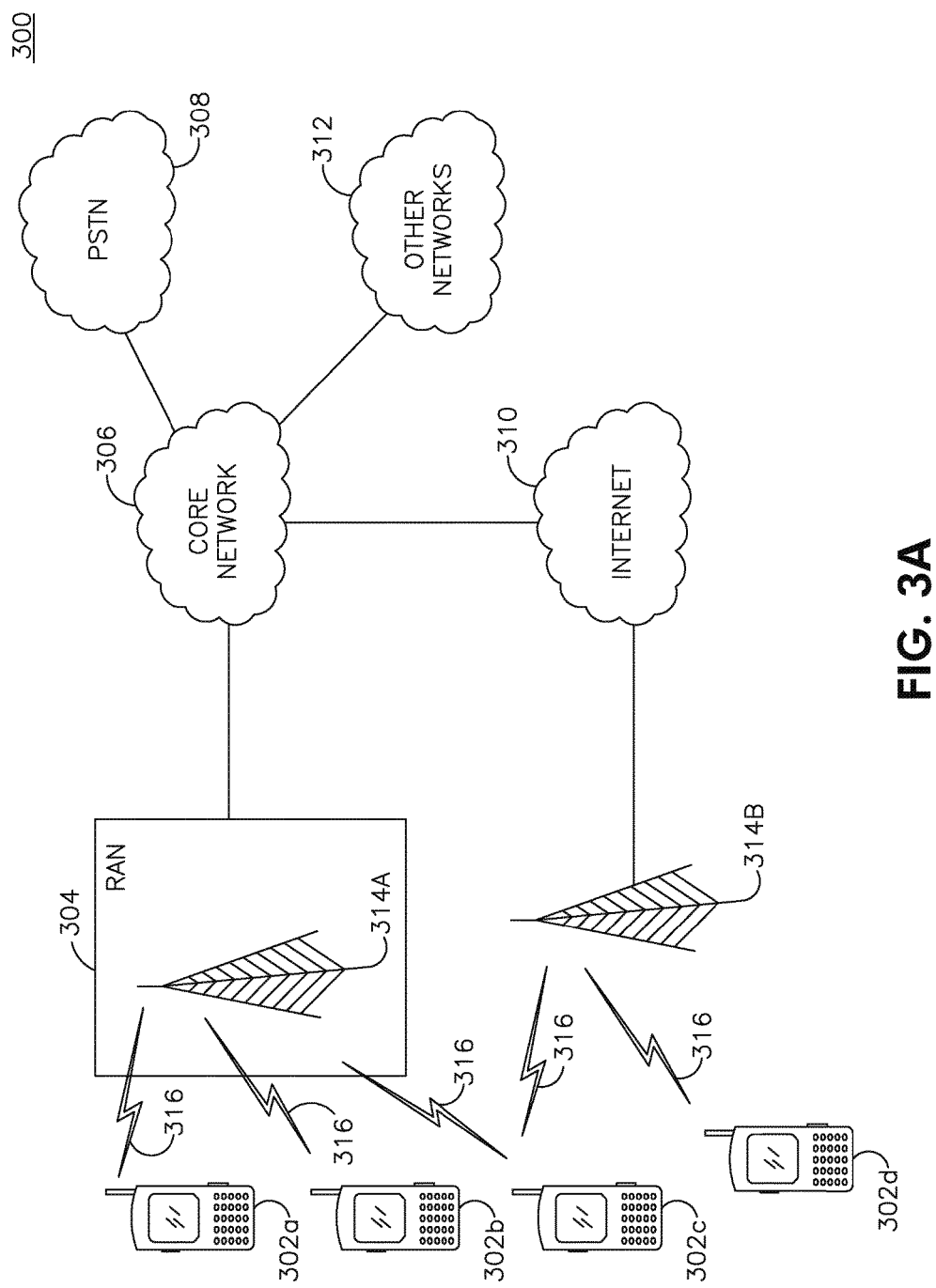
FIG. 3A is a system diagram of an example communications system in which one or more disclosed embodiments may be implemented.

FIG. 3A is a diagram of an example communications system 300 in which one or more disclosed embodiments may be implemented. The communications system 300 may be a multiple access system that provides content, such as voice, data, video, messaging, broadcast, etc., to multiple wireless users. The communications system 300 may enable multiple wireless users to access such content through the sharing of system resources, including wireless bandwidth. For example, the communications systems 300 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 3A, the communications system 300 may include WTRUs 302a, 302b, 302c, 302d, a radio access network (RAN) 304, a core network 306, a public switched telephone network (PSTN) 308, the Internet 310, and other networks 312, though it will be appreciated that the disclosed embodiments contemplate any number of WTRUs, base stations, networks, and/or network elements. Each of the WTRUs 302a, 302b, 302c, 302d may be any type of device configured to operate and/or communicate in a wireless environment. By way of example, the WTRUs 302a, 302b, 302c, 302d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 300 may also include a base station 314a and a base station 314b. Each of the base stations 314a, 314b may be any type of device configured to wirelessly interface with at least one of the WTRUs 302a, 302b, 302c, 302d to facilitate access to one or more communication networks, such as the core network 306, the Internet 310, and/or the networks 312. By way of example, the base stations 314a, 314b may be a base transceiver station (BTS), a Node-B, an eNode B, a Home Node B, a Home eNode B, a site controller, an access point (AP), a wireless router, and the like. While the base stations 314a, 314b are each depicted as a single element, it will be appreciated that the base stations 314a, 314b may include any number of interconnected base stations and/or network elements.

The base station 314a may be part of the RAN 304, which may also include other base stations and/or network elements (not shown), such as a base station controller (BSC), a radio network controller (RNC), relay nodes, etc. The base station 314a and/or the base station 314b may be configured to transmit and/or receive wireless signals within a particular geographic region, which may be referred to as a cell (not shown). The cell may further be divided into cell sectors. For example, the cell associated with the base station 314a may be divided into three sectors. Thus, in one embodiment, the base station 314a may include three transceivers, i.e., one for each sector of the cell. In another embodiment, the base station 314a may employ multiple-input multiple output (MIMO) technology and, therefore, may utilize multiple transceivers for each sector of the cell.

The base stations 314a, 314b may communicate with one or more of the WTRUs 302a, 302b, 302c, 302d over an air interface 316, which may be any suitable wireless communication link (e.g., radio frequency (RF), microwave, infrared (IR), ultraviolet (UV), visible light, etc.). The air interface 316 may be established using any suitable radio access technology (RAT).

More specifically, as noted above, the communications system 300 may be a multiple access system and may employ one or more channel access schemes, such as CDMA, TDMA, FDMA, OFDMA, SC-FDMA, and the like. For example, the base station 314a in the RAN 304 and the WTRUs 302a, 302b, 302c may implement a radio technology such as Universal Mobile Telecommunications System (UMTS) Terrestrial Radio Access (UTRA), which may establish the air interface 316 using WCDMA. WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 314a and the WTRUs 302a, 302b, 302c may implement a radio technology such as Evolved UMTS Terrestrial Radio Access (E-UTRA), which may establish the air interface 316 using LTE and/or LTE-Advanced (LTE-A).

In other embodiments, the base station 314a and the WTRUs 302a, 302b, 302c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 314b in FIG. 3A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 314b and the WTRUs 302c, 302d may implement a radio technology such as IEEE 802.11 to establish a wireless local area network (WLAN). In another embodiment, the base station 314b and the WTRUs 302c, 302d may implement a radio technology such as IEEE 802.15 to establish a wireless personal area network (WPAN). In yet another embodiment, the base station 314b and the WTRUs 302c, 302d may utilize a cellular-based RAT (e.g., WCDMA, CDMA2000, GSM, LTE, LTE-A, etc.) to establish a picocell or femtocell. As shown in FIG. 3A, the base station 314b may have a direct connection to the Internet 310. Thus, the base station 314b may not be required to access the Internet 310 via the core network 306.

The RAN 304 may be in communication with the core network 306, which may be any type of network configured to provide voice, data, applications, and/or voice over internet protocol (VoIP) services to one or more of the WTRUs 302a, 302b, 302c, 302d. For example, the core network 306 may provide call control, billing services, mobile location-based services, pre-paid calling, Internet connectivity, video distribution, etc., and/or perform high-level security functions, such as user authentication. Although not shown in FIG. 3A, it will be appreciated that the RAN 304 and/or the core network 306 may be in direct or indirect communication with other RANs that employ the same RAT as the RAN 304 or a different RAT. For example, in addition to being connected to the RAN 304, which may be utilizing an E-UTRA radio technology, the core network 306 may also be in communication with another RAN (not shown) employing a GSM radio technology.

The core network 306 may also serve as a gateway for the WTRUs 302a, 302b, 302c, 302d to access the PSTN 308, the Internet 310, and/or other networks 312. The PSTN 308 may include circuit-switched telephone networks that provide plain old telephone service (POTS). The Internet 310 may include a global system of interconnected computer networks and devices that use common communication protocols, such as the transmission control protocol (TCP), user datagram protocol (UDP) and the internet protocol (IP) in the TCP/IP internet protocol suite. The networks 312 may include wired or wireless communications networks owned and/or operated by other service providers. For example, the networks 312 may include another core network connected to one or more RANs, which may employ the same RAT as the RAN 304 or a different RAT.

Some or all of the WTRUs 302a, 302b, 302c, 302d in the communications system 300 may include multi-mode capabilities, i.e., the WTRUs 302a, 302b, 302c, 302d may include multiple transceivers for communicating with different wireless networks over different wireless links. For example, the WTRU 302c shown in FIG. 3A may be configured to communicate with the base station 314a, which may employ a cellular-based radio technology, and with the base station 314b, which may employ an IEEE 802 radio technology.

Figure 3B:
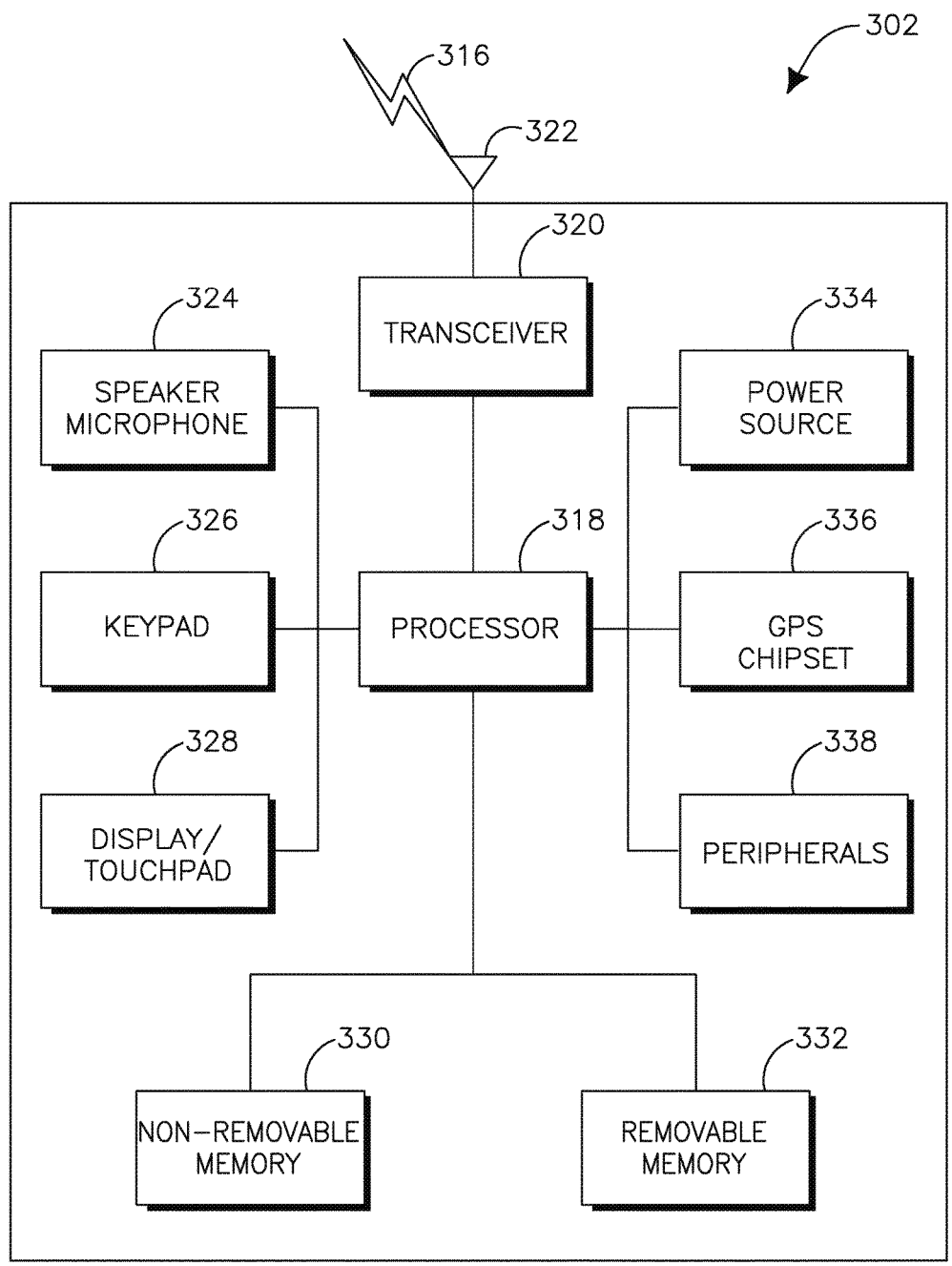
FIG. 3B is a system diagram of an example a WTRU that may be used within the communications system illustrated in FIG. 3A.

FIG. 3B is a system diagram of an example WTRU 302. As shown in FIG. 3B, the WTRU 302 may include a processor 318, a transceiver 320, a transmit/receive element 322, a speaker/microphone 324, a keypad 326, a display/touchpad 328, non-removable memory 330, removable memory 332, a power source 334, a global positioning system (GPS) chipset 336, and other peripherals 338. It will be appreciated that the WTRU 302 may include any subcombination of the foregoing elements while remaining consistent with an embodiment.

The processor 318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 318 may perform signal coding, data processing, power control, input/output processing, and/or any other functionality that enables the WTRU 302 to operate in a wireless environment. The processor 318 may be coupled to the transceiver 320, which may be coupled to the transmit/receive element 322. While FIG. 3B depicts the processor 318 and the transceiver 320 as separate components, it will be appreciated that the processor 318 and the transceiver 320 may be integrated together in an electronic package or chip.

The transmit/receive element 322 may be configured to transmit signals to, or receive signals from, a base station (e.g., the base station 314a) over the air interface 316. For example, in one embodiment, the transmit/receive element 322 may be an antenna configured to transmit and/or receive RF signals. In another embodiment, the transmit/receive element 322 may be an emitter/detector configured to transmit and/or receive IR, UV, or visible light signals, for example. In yet another embodiment, the transmit/receive element 322 may be configured to transmit and receive both RF and light signals. It will be appreciated that the transmit/receive element 322 may be configured to transmit and/or receive any combination of wireless signals.

In addition, although the transmit/receive element 322 is depicted in FIG. 3B as a single element, the WTRU 302 may include any number of transmit/receive elements 322. More specifically, the WTRU 302 may employ MIMO technology. Thus, in one embodiment, the WTRU 302 may include two or more transmit/receive elements 322 (e.g., multiple antennas) for transmitting and receiving wireless signals over the air interface 316.

The transceiver 320 may be configured to modulate the signals that are to be transmitted by the transmit/receive element 322 and to demodulate the signals that are received by the transmit/receive element 322. As noted above, the WTRU 302 may have multi-mode capabilities. Thus, the transceiver 320 may include multiple transceivers for enabling the WTRU 302 to communicate via multiple RATs, such as UTRA and IEEE 802.11, for example.

The processor 318 of the WTRU 302 may be coupled to, and may receive user input data from, the speaker/microphone 324, the keypad 326, and/or the display/touchpad 328 (e.g., a liquid crystal display (LCD) display unit or organic light-emitting diode (OLED) display unit). The processor 318 may also output user data to the speaker/microphone 324, the keypad 326, and/or the display/touchpad 328. In addition, the processor 318 may access information from, and store data in, any type of suitable memory, such as the non-removable memory 330 and/or the removable memory 332. The non-removable memory 330 may include random-access memory (RAM), read-only memory (ROM), a hard disk, or any other type of memory storage device. The removable memory 332 may include a subscriber identity module (SIM) card, a memory stick, a secure digital (SD) memory card, and the like. In other embodiments, the processor 318 may access information from, and store data in, memory that is not physically located on the WTRU 302, such as on a server or a home computer (not shown).

The processor 318 may receive power from the power source 334, and may be configured to distribute and/or control the power to the other components in the WTRU 302. The power source 334 may be any suitable device for powering the WTRU 302. For example, the power source 334 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 318 may also be coupled to the GPS chipset 336, which may be configured to provide location information (e.g., longitude and latitude) regarding the current location of the WTRU 302. In addition to, or in lieu of, the information from the GPS chipset 336, the WTRU 302 may receive location information over the air interface 316 from a base station (e.g., base stations 314a, 314b) and/or determine its location based on the timing of the signals being received from two or more nearby base stations. It will be appreciated that the WTRU 302 may acquire location information by way of any suitable location-determination method while remaining consistent with an embodiment.

The processor 318 may further be coupled to other peripherals 338, which may include one or more software and/or hardware modules that provide additional features, functionality and/or wired or wireless connectivity. For example, the peripherals 338 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3C:
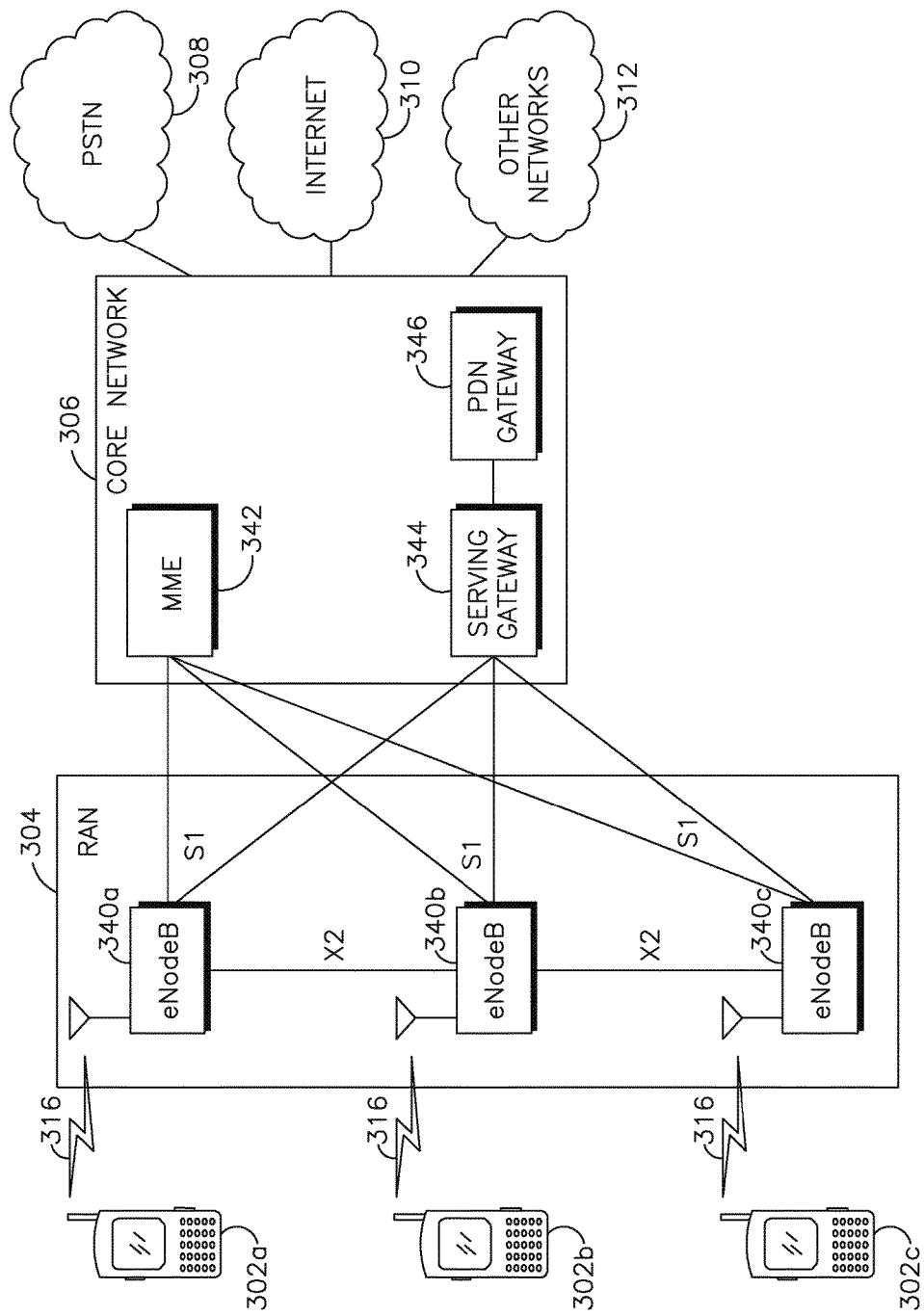
FIG. 3C is a system diagram of an example radio access network and an example core network that may be used within the communications system illustrated in FIG. 3A.

FIG. 3C is a system diagram of the RAN 304 and the core network 306 according to an embodiment. As noted above, the RAN 304 may employ an E-UTRA radio technology to communicate with the WTRUs 302a, 302b, 302c over the air interface 316. The RAN 304 may also be in communication with the core network 306.

The RAN 304 may include eNode-Bs 340a, 340b, 340c, though it will be appreciated that the RAN 304 may include any number of eNode-Bs while remaining consistent with an embodiment. The eNode-Bs 340a, 340b, 340c may each include one or more transceivers for communicating with the WTRUs 302a, 302b, 302c over the air interface 316. In one embodiment, the eNode-Bs 340a, 340b, 340c may implement MIMO technology. Thus, the eNode-B 340a, for example, may use multiple antennas to transmit wireless signals to, and receive wireless signals from, the WTRU 302a.

Each of the eNode-Bs 340a, 340b, 340c may be associated with a particular cell (not shown) and may be configured to handle radio resource management decisions, handover decisions, scheduling of users in the uplink and/or downlink, and the like. As shown in FIG. 3C, the eNode-Bs 340a, 340b, 340c may communicate with one another over an X2 interface.

The core network 306 shown in FIG. 3C may include a MME 342, a serving gateway 344, and a packet data network (PDN) gateway 346. While each of the foregoing elements are depicted as part of the core network 306, it will be appreciated that any one of these elements may be owned and/or operated by an entity other than the core network operator.

The MME 342 may be connected to each of the eNode-Bs 340a, 340b, 340c in the RAN 304 via an S1 interface and may serve as a control node. For example, the MME 342 may be responsible for authenticating users of the WTRUs 302a, 302b, 302c, bearer activation/deactivation, selecting a particular serving gateway during an initial attach of the WTRUs 302a, 302b, 302c, and the like. The MME 342 may also provide a control plane function for switching between the RAN 304 and other RANs (not shown) that employ other radio technologies, such as GSM or WCDMA.

The serving gateway 344 may be connected to each of the eNode Bs 340a, 340b, 340c in the RAN 304 via the S1 interface. The serving gateway 344 may generally route and forward user data packets to/from the WTRUs 302a, 302b, 302c. The serving gateway 344 may also perform other functions, such as anchoring user planes during inter-eNode B handovers, triggering paging when downlink data is available for the WTRUs 302a, 302b, 302c, managing and storing contexts of the WTRUs 302a, 302b, 302c, and the like.

The serving gateway 344 may also be connected to the PDN gateway 346, which may provide the WTRUs 302a, 302b, 302c with access to packet-switched networks, such as the Internet 310, to facilitate communications between the WTRUs 302a, 302b, 302c and IP-enabled devices.

The core network 306 may facilitate communications with other networks. For example, the core network 306 may provide the WTRUs 302a, 302b, 302c with access to circuit-switched networks, such as the PSTN 308, to facilitate communications between the WTRUs 302a, 302b, 302c and traditional land-line communications devices. For example, the core network 306 may include, or may communicate with, an IP gateway (e.g., an IP multimedia subsystem (IMS) server) that serves as an interface between the core network 306 and the PSTN 308. In addition, the core network 306 may provide the WTRUs 302a, 302b, 302c with access to the networks 312, which may include other wired or wireless networks that are owned and/or operated by other service providers.

Figure 4:
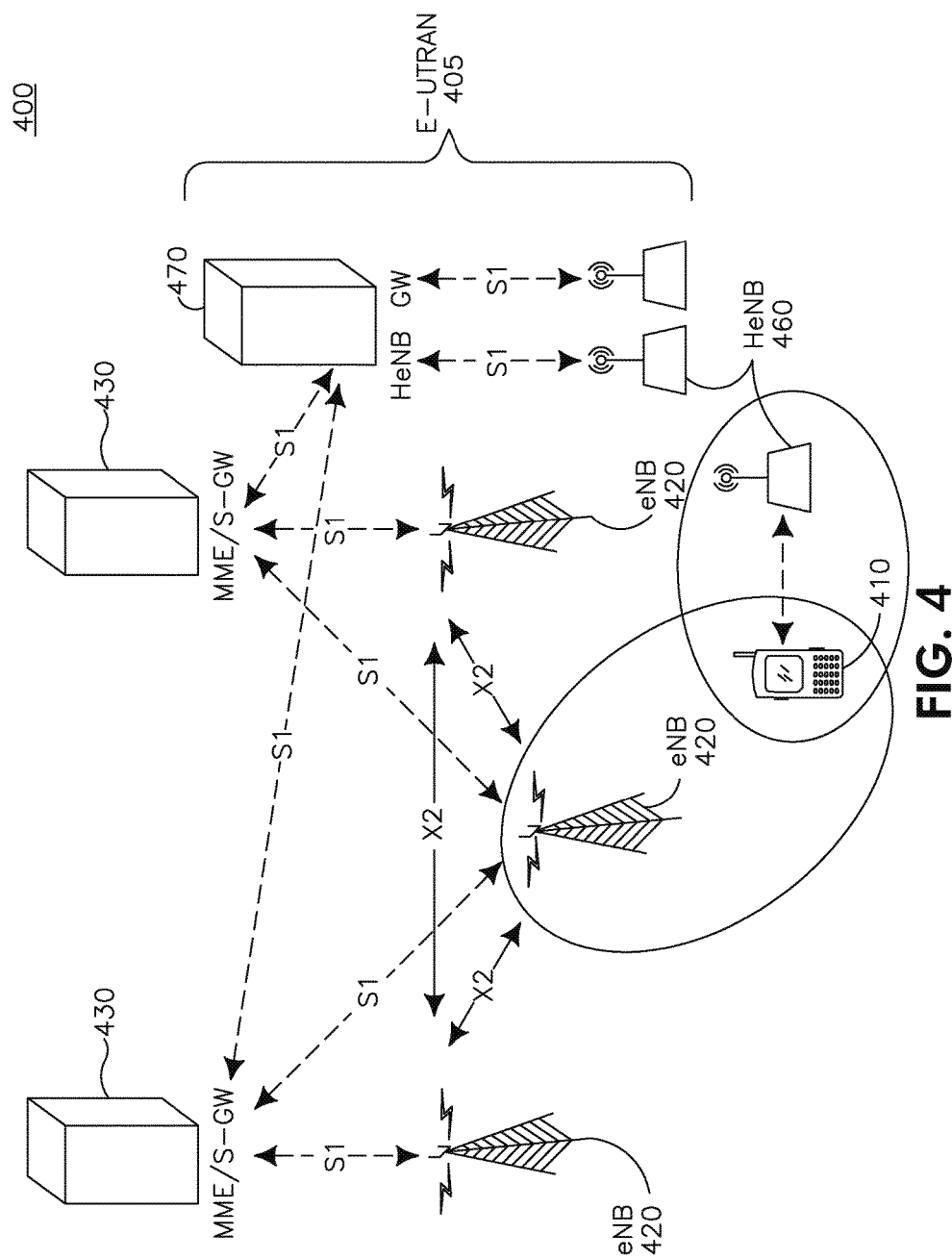
FIG. 4 shows an LTE wireless communication system/access network.

FIG. 4 shows an LTE wireless communication system/access network 400 that includes an Evolved-Universal Terrestrial Radio Access Network (E-UTRAN) 405. The E-UTRAN 405 includes several evolved Node-Bs, (eNBs) 420 and HeNBs 460. The WTRU 410 is in communication with an eNB 420 and a HeNB 460. The eNBs 420 interface with each other using an X2 interface. Each of the eNBs 420 interface with a MME/serving GateWay (S-GW) 430 through an S1 interface. The HeNBs 460 are also connected to a HeNB Gateway (HeNB GW) 470 through a S1 interface. The HeNB 460 and the HeNB GW 470 connect to the MME/S-GW 430 through the S1 interface. The HeNB GW 470 appears to the MME/S-GW 430 as an eNB 420. The HeNB GW 470 appears to the HeNB 460 as an MME/S-GW 430.

Although a single WTRU 410, three eNBs 420 and three HeNBs 460 are shown in FIG. 4, it should be apparent that any combination of wireless and wired devices may be included in the wireless communication system/access network 400.

Figure 5:
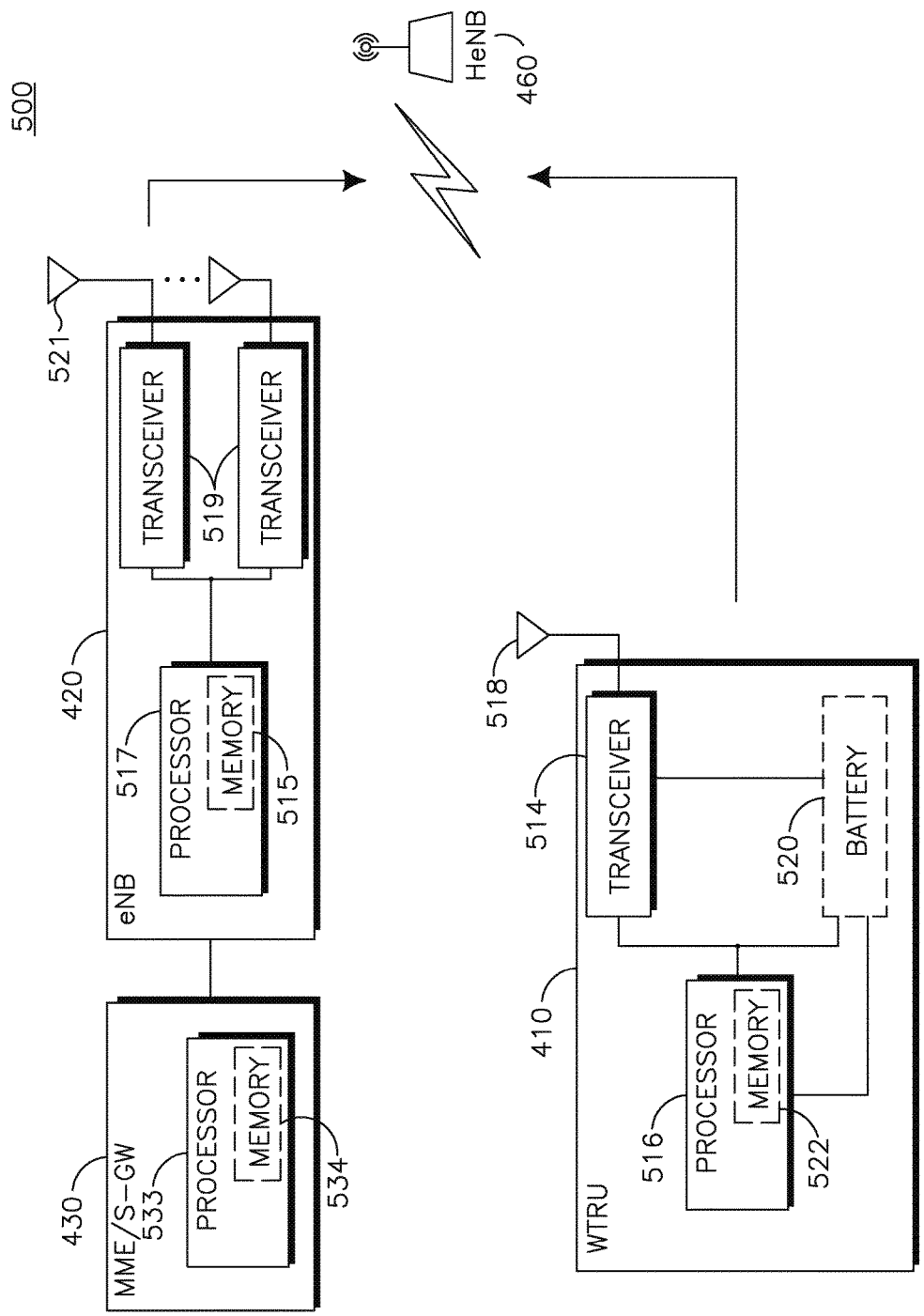
FIG. 5 shows an example of an LTE wireless communication system shown in FIG. 4.

FIG. 5 shows an example of an LTE wireless communication system 500 including the WTRU 410, the eNB 420, and the MME/S-GW 430. As shown in FIG. 5, the WTRU 410, the eNB 420 and the MME/S-GW 430 are configured to perform a method for adding CSG IDs to a white list in connected mode.

In addition to the components that may be found in a typical WTRU, the WTRU 410 includes a processor 516 with an optional linked memory 522, at least one transceiver 514, an optional battery 520, and an antenna 518. The processor 516 is configured to perform a method of resolving PCI confusion for inbound mobility to CSG cell and hybrid cell. The transceiver 514 is in communication with the processor 516 and the antenna 518 to facilitate the transmission and reception of wireless communications. In case a battery 520 is used in the WTRU 410, it powers the transceiver 514 and the processor 516.

In addition to the components that may be found in a typical eNB, the eNB 420 includes a processor 517 with an optional linked memory 515, transceivers 519, and antennas 521. The processor 517 is configured to perform a method of resolving PCI confusion for inbound mobility to a CSG cell and a hybrid cell.

The transceivers 519 are in communication with the processor 517 and antennas 521 to facilitate the transmission and reception of wireless communications. The eNB 420 is connected to the MME/S-GW 430 which includes a processor 533 with an optional linked memory 534. The MME/S-GW 430, eNB 420, and WTRU 410 are in communication with the HeNB 460.

Inbound mobility, which refers to a handover from a macro cell to a HNB, may apply to intra-frequency scenarios (i.e., macro cell and HNB are on the same frequency) as well as for inter-frequency scenarios (i.e., macro cell and HNB are on different frequencies) both for UMTS and LTE. Inbound mobility inside the same RAT (e.g., UMTS or LTE) may be accomplished in any of the following ways. These examples are not exhaustive and one skilled in the art may recognize that other ways are also possible.

In one example, PSC/PCI confusion, due to HNBs using the same PCI/PSC, may be resolved by having the WTRU read the SI (SI) of the HNB to get the cell identity (E-CGI/tracking area identity (TAI) for LTE) of the HNB and report it to the network.

In another example, the WTRU may perform a preliminary access check, a check that the CSG ID of the HNB is part of the WTRU white list, before reporting the HNB to the network. The network may only have to initiate the handover preparation for the cells for which the WTRU has verified the CSG ID.

In another example, cells may broadcast the PSC/PCI split of the CSG cells but may not broadcast the PSC/PCI split of the hybrid cells.

In another example, UMTS inter-frequency and LTE inter-frequency PSC/PCI detection for non-CSG member WTRUs will not require any particular mechanisms. In order to perform PSC/PCI detection for CSG member WTRUs may use compressed mode (CM)/measurement gaps that may be triggered based on a WTRU indication (e.g., based on a fingerprint or manual search). Fingerprint may be referred to the physical location of the WTRU with respect to the CSG cell.

In a UMTS intra-frequency scenario, the WTRU may not need gaps to read the SI of the HNB. In UMTS inter-frequency and LTE intra- and inter-frequency scenarios, the WTRU may use autonomous gaps or scheduled gaps to read the SI of the HNB. Idle periods during discontinuous reception (DRX) may be used provided that available and autonomous gaps may be controlled by the eNB. In a UMTS intra-frequency scenario, as part of measurement configuration, the network may configure a range of PSCs for which the WTRU may perform access checks and report additional information when reporting measurements.

In the current state of the HNB specifications, CSG IDs may be added to the WTRU's allowed list by manual selection in idle mode and successful registration. However, the WTRU may not handover in connected mode to a HNB with an ID that is not part of its white list, unless there is an ongoing emergency call. For example, if the user enters a coffee shop for the first time during a connection, the WTRU may not be allowed to handover to the HNB belonging to the coffee shop. It may have to wait until the connection is over to register in the idle mode. In some cases, such as, internet browsing, the user remains in connected mode for a long period of time and does not wish to interrupt the current connection for registering with the network to access a HNB the user has not previously visited.

Additionally, if the WTRU is in idle mode, an autonomous search function may not be performed in the WTRU if the CSG white list is empty. If the CSG identity of the target cell does not match any of the CSGs in the white list, the WTRU does not attempt to perform cell reselection.

When manual search or autonomous search is referred to herein, it implies that the search is only targeted to a HNB, meaning that autonomous search is equivalent to autonomous search for HNB and manual search is equivalent to manual search for HNB.

Manual and autonomous searches are described as being performed while the WTRU is in connected mode and are performed for finding new HNBs, meaning HNBs for which CSG IDs are not part of the WTRU white list.

The expression 'signaled to the WTRU' indicates that the network sends configuration parameters to the WTRU by means of an existing radio resource control (RRC) or non-access stratum (NAS) message or by means of a new RRC or NAS message. For example, in the existing RRC message case, the message may be a measurement control message in UMTS or an RRCConnectionReconfiguration message in LTE.

A number of procedures allow the WTRU to search and add one or more CSG IDs to the WTRU white list while in connected mode (or optionally, in idle mode as well). Such procedures include but are not limited to WTRU autonomous search or a manual search, WTRU-initiated procedures, or network-initiated procedures. Additionally, methods that allow the network and/or the NAS to add CSG IDs are also described.

When referred to hereafter, idle mode may refer to idle mode in LTE systems and/or to idle mode, CELL_PCH, URA_PCH, or CELL_FACH mode. In other words, in LTE connected mode and in UMTS cell_DCH, change of serving cell is performed through handover while in LTE idle mode and in UMTS idle, cell_PCH, ura_PCH and cell_FACH modes, change of cell is performed through cell reselection.

Figure 6:
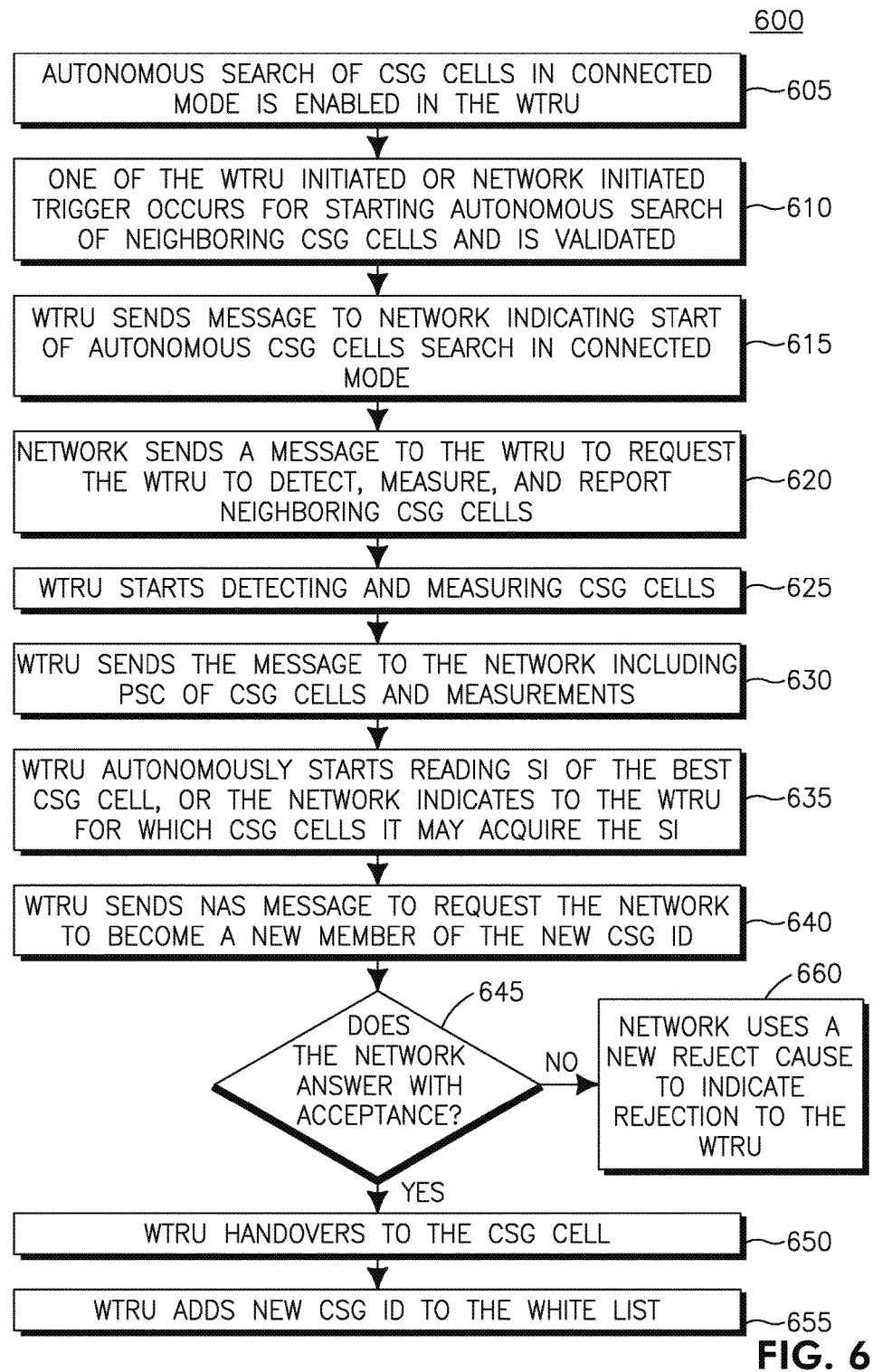
FIG. 6 illustrates a flow diagram of a procedure for adding CSG IDs to a white list in a connected mode.

FIG. 6 illustrates a flow diagram of a procedure 600 for searching and adding CSG IDs to a white list while in a connected mode. An autonomous search of a CSG cell in connected mode is enabled in the WTRU at 605. Either a WTRU initiated trigger or network initiated trigger events occurs for starting the autonomous search of neighboring CSG cells and is validated at 610. The WTRU initiated triggers and the network initiated triggers are described hereafter. The WTRU is configured to send a message to the network indicating the start of an autonomous CSG cell search in the connected mode at 615. The network is configured to send a message to the WTRU to request the WTRU to detect, measure, and report neighboring CSG cells at 620. The WTRU starts detecting and measuring CSG cells at 625. The WTRU sends a message to the network including a PSC of CSG cells and measurements at 630. The WTRU autonomously starts reading SI of the best CSG cell, or the network indicates to the WTRU the CSG cell for which CSG cells it may acquire the SI at 635. The WTRU sends a NAS message to request the network to become a member of the new CSG ID at 640. The WTRU determines whether the network responds with acceptance or rejection at 645. On a condition that the WTRU receives response with acceptance, the WTRU handovers to the CSG cell at 650. The WTRU adds the new CSG ID to the white list at 655. On a condition that the network answers with a rejection, the network uses a new reject cause to indicate the rejection to the WTRU at 660.

Each of the actions described in FIG. 6 are described in more detail hereinafter. The triggers to initiate a HNB search include, but are not limited to, WTRU initiated and network initiated triggers.

In a WTRU initiated scenario, the WTRU may autonomously initiate the search for neighboring HNBs or the WTRU may initiate a report to the network to indicate a need or desire for measurement, as described in 605. To allow the WTRU to start measuring and/or detecting other HNBs, a number of procedures and solutions are described. The procedures described herein allow the WTRU to extend the search procedures to measure and/or detect and connect to a previously unvisited HNB or to a CSG having an ID that was not previously in the WTRU's CSG white list.

To efficiently allow the WTRU to limit excessive HNB searches, battery consumption, and disruptions to current connections, the WTRU may initiate the procedure as a result of one or a combination of the following triggers at 610. These triggers may also be initiated by the network at 610, which serve merely as examples and is not an exhaustive list.

One of the triggers may be that the WTRU is not already connected to a HNB. For example, the WTRU is connected to a macro cell or the signal quality of the current serving cell goes below a predefined threshold. Optionally, the signal quality must remain below the threshold for a configured period of time to trigger. This threshold may be determined by the WTRU or signaled by the network.

Another trigger may be that the signal quality of the current frequency goes below a predefined threshold. Optionally, the signal quality must remain below the threshold for a configured period of time to trigger. This threshold may be determined by the WTRU or signaled by the network.

The priority level, for the current CSG on which the WTRU is on, has changed. Alternatively, the WTRU is determined to be in a low mobility state. For example, if the WTRU mobility is low, it may be assumed that the user is indoors where a HNB may be available. Examples of locations with low WTRU mobility include private homes, airports, coffee shops, enterprises, and the like.

Another trigger may be that the user activity becomes such that the data rate available on the current serving cell is no longer sufficient. For example, if the serving cell is a macro cell, it is possible that the user may get a better data rate on a HNB.

Another trigger may occur when the white list of the WTRU is empty. This may imply that the WTRU is a HNB-capable WTRU with a potential subscription that has been unable to register with the CSG cell. This may allow the WTRU to attempt to add a new CSG ID in its white list. Additionally, the default or configured time may have elapsed and the WTRU may not have attempted registration on a HNB with a matching ID or the WTRU may not have detected any CSG with the same ID. For example, this may be due to the addition of a CSG ID in a roaming area which has been left by the WTRU and the CSG ID is still in its white list. Alternatively, a trigger may occur when there are no HNB fingerprints stored in the WTRU.

The user enters an area in which there is a high probability of a presence of a HNB and for which the WTRU does not have any HNB fingerprint stored. The probability of HNB presence may be determined by the network depending on the WTRU's approximate location (e.g., based on a GPS or on a macro cell's neighbor list) and signaled to the WTRU. The WTRU may optionally store a list of areas where HNBs are available using the network indications or via a pre-configured list. For example, this may be signaled over the macro cell to the WTRU. A broadcast or dedicated RRC indication may be used to notify HNB-cap able WTRUs that the current area may potentially contain HNBs with which the WTRU may connect temporarily. Also, this may be implied if there are changes to the services available in the current cell or current tracking area, routing area, and the like. For example, if the WTRU is informed that there is availability of services such as selected Internet protocol (IP) traffic offload (SIPTO) (or other types of services, such as, local IP access (LIPA)) via NAS signaling routing area update accept, or any other method, the WTRU may assume the availability of HNBs.

The autonomous search may be triggered periodically, with a period determined by the WTRU or signaled by the network and which may optionally depend on the type of location the WTRU is in. For example, in an urban area the timer duration may be shorter than in a rural area.

A manual search is triggered by the user while the WTRU is in connected mode. Alternatively, a trigger may be when an amount of time has elapsed since the last time the WTRU attempted to connect/register to a HNB in the area.

Another trigger may be when upon power on or re-registration to the network, regardless of whether the WTRU's white list is empty, or upon selection of a new public land mobile network (PLMN), or after an inter-PLMN handover. Alternatively, when the WTRU detects a hybrid CSG cell or enters an area for which it knows it had previously detected or connected to a hybrid cell, a trigger may occur.

Additionally, the autonomous search may only be triggered in the case that the WTRU is not in the fingerprint area of a HNB for which the CSG is in the WTRU's white list. This is because it may be preferable to search for the previously visited HNB rather than to add a new CSG ID to the white list. The user may still force a manual search if the user is interested in handing over to a new HNB instead of a previously visited HNB.

To limit the number of HNB searches in connected mode, the network may restrict the WTRU to only use the manual search triggered by the user and disable the autonomous search initiated by the WTRU without user's interaction. Additionally, allowing the autonomous search may be an option configurable by the user of the WTRU.

Further, the network may initiate or trigger the WTRU to start measurements/detection of HNBs at 610. This may be done by an explicit indication from the network to the WTRU to initiate measurements or by triggering the WTRU to start autonomous search and measurements of HNBs even if the white list is empty. This may be done, for example, via a dedicated RRC message or via a broadcast, advertisement, or implementation. These solutions may be applicable to both connected and idle mode mobility.

In one example, the initiation of the procedures may be done via explicit dedicated signaling to the WTRU. In another example, the network may send the information to all WTRUs connected to a macro cell.

Either of the examples may be performed as a result of reception of an indication from the WTRU that certain services or mode of operation have been enabled. For example, based on user interaction, the WTRU's mode of operation may be changed such that SIPTO/LIPA services or other services are desired. This may trigger an indication, for example, a SIPTO/LIPA capability enabled indication, to the network which then requests the WTRU to start detection/measurements.

While the WTRU is under the coverage of a macro cell in connected mode, the network may use the commercial mobile alert system (CMAS) or any other broadcast feature to advertise the existence of one or multiple public, private, or hybrid CSG cells. The network advertizes HNBs by sending one or any combination of the parameters, such as, CSG IDs, PCI/PSC range or list, frequencies, CSG dedicated frequencies, RATs, or a CSG presence indication (1 bit). This information may be broadcasted to the WTRU via the macro cell or sent to the WTRU via multicast services such as multimedia and broadcast multicast services (MBMS).

Based on the WTRU reported/known capabilities, the network may decide to send a dedicated message to a WTRU or group of WTRUs indicating the presence of the HNBs containing one or any combination of the above parameters. The dedicated message may be transmitted to the WTRU via an RRC reconfiguration message or a measurement control message.

Upon reception and decoding of the message, the WTRU in connected mode may decide based on an algorithm to use or start its autonomous search if allowed at 625, or manual search based on user decision to search for the HNBs using its search capabilities on different frequencies or RATs. The actions associated upon these indications are described in more detail below.

If the network signals only the CSG presence indication, then the WTRU may, in addition to this indication, use any of the procedures defined above. Provided one of the above mentioned conditions or triggers are met and the WTRU may begin searching autonomously.

Additionally, as another HNB search trigger, depending on the information sent by the network, WTRU capabilities, and internal settings, the WTRU may notify the user and request user's permission to start manual search according to HNB presence. The user may also choose to stop the autonomous search function under these conditions.

Provided the WTRU fails to find any PCI/PSC for defined timer duration, the WTRU may autonomously stop looking for HNBs. The timer may be network signaled, user defined, or a WTRU internal per PSC/PCI defined timer. The WTRU may periodically notify the user about the search progress, so that the user may manually cancel the procedure. The WTRU may stop searching after detecting one or a group of PCI/PSC being limited by a counter that may be user, network, or internally defined. The WTRU may stop the HNB PCI/PSC search after a defined number of retries on all or a limited number of frequencies or bands based on its capabilities.

Provided one or a combination of the above mentioned conditions/triggers is met, the WTRU may autonomously initiate a HNB search procedure. One or a combination of the following actions upon triggering of a HNB search may be performed. The WTRU may scan all frequencies in the supported bands. The WTRU may only scan CSG dedicated frequencies if available or if provided to the WTRU. The WTRU may scan only a subset of frequencies designated for HNB search in connected mode. If no PSC/PCI CSG split is provided to the WTRU at the point at which autonomous search is initiated, the WTRU may measure and report all detected PSC/PCIs on the frequency it is scanning. If a PSC/PCI range is provided to the WTRU, the WTRU may detect the PSC/PCIs that are part of the CSG PSC/PCI split, measure, and, optionally, report them in the new frequency at 625.

The WTRU may, optionally, indicate to the network that the reported PSC/PCI is an unvisited PSC/PCI. This indication may be used by the network to determine whether it should explicitly signal to the WTRU to read the SI of the cell.

Given that a PSC/PCI confusion may exist, the WTRU may also need to acquire the SI of HNBs. For the intra-frequency case, the WTRU may have already detected and measured the PSC/PCI corresponding to the HNB in the vicinity but may not have measured the SI. Therefore, the WTRU may initiate an autonomous SI reading on the same frequency provided one of the above triggers has occurred. The WTRU may choose to autonomously acquire the SIs for highest ranked or best quality cells at 635. Once the SIs are read, the WTRU may send a measurement report to the network with all of the PSC/PCI and SI information for each.

Also, the WTRU may read the SI of a HNB, according to user selection. This may be achieved by displaying the set of provided HNB names (e.g., via broadcast or dedicated messages) to the user, provided that the signal quality of the displayed HNB is above a threshold and allowing the user to make a selection. The user may either make a selection of the HNB to attempt to connect to, provided it has the list of the name and PSC/PCI associated, or the user may trigger a manual search in response to the message. The user may also trigger an autonomous SI acquisition of the neighboring cell.

For idle mode WTRUs, the WTRU may chose to reselect to the best cell or the highest ranked cell in that frequency, even if the CSG ID does not match any of the CSGs in the white list. This may, optionally, be done only if the WTRU is in a low activity mode and if one of the triggers defined above is met. The autonomous SI reading may also be triggered for the inter-frequency search case provided one of the conditions above is met.

Upon reading the SI and acquiring the cell identity, HNB name, CSG, and the like, the WTRU may perform one or a combination of the following. The WTRU may report this information to the network. The WTRU may reselect to the best cell in the detected/measured set even if the CSG ID is not in the white list. The WTRU may display the set of provided HNB names (e.g., via broadcast or dedicated messages) to the user provided that the signal quality of the displayed HNB is above a threshold and allow the user to make a selection.

In idle mode, for example, the WTRU may choose to read the SI of the target CSG cell (e.g., the highest ranked cell) while still being camped on the source cell. The WTRU may read the SI, and if no CSG match is detected, it may display the name of the HNB to the user and ask if the user wants to connect to this HNB. Depending on the user's knowledge of recent subscriptions and if the user chooses to attempt to add this cell, the WTRU may trigger a cell reselection to the target CSG cell. Also, the WTRU may send an indication to the network to add the CSG ID to the white list via the source cell, using an RRC message. For example, this may be performed via a CELL_UPDATE message where the WTRU appends the CSG ID of the target cell that is not on the white list. A new cause for cell update may be introduced (e.g., CSG addition) or an RRC connection request message may be used. Also, it may trigger a NAS level message or a dedicated RRC message.

Upon selection of a cell to add to the white list, the WTRU in connected mode may send a report to the network. It may report all cells detected or measured, a subset of the measured cells fulfilling a set of criteria, or the selected cell. The report may contain the signal quality of the cell, the CSG ID, the cell identity, and optionally an indication that the WTRU wishes to attempt to add this CSG to its white list, even if it is a non-member. This may be done via a one bit indication to the network, or by falsely indicating that the CSG is a member. Provided the CSG ID access check is performed on the network side and fails, it may mean that the WTRU should not add this cell to the white list. If it passes in the MME, for example, that indicates that the WTRU is allowed on the CSG.

Also, the WTRU may use the likely indication bit together with the provided SI information to report to the network that it wishes to attempt to be added.

In an alternate embodiment, the WTRU does not perform autonomous detection and/or measurements of the SI. The WTRU may send an indication to the network that it wishes to perform a CSG search/detection/SI measurement even though it does not believe it is in the vicinity of a visited CSG cell (e.g., in its fingerprint). This may be in the form of one or more bits added to the proximity indication message or a new message/event added for this purpose. This bit may provide manual search triggered, periodic search triggered, CSG white list empty, CSG white list empty but user believes it has a subscription, or user desires to measure CSGs even if not in fingerprint. The network may then configure the WTRU to take measurements and report the measurements to the network accordingly.

If the WTRU detects PCI/PSC having a reasonable signal quality (i.e., better than a predefined threshold), the WTRU may follow the procedures listed herein and the procedures for updating the white list and fingerprint, before finally performing the handover procedure.

Updating the white list in connected mode and handover procedure are now described. Provided one of the triggers (i.e., WTRU-initiated or network-initiated) above is met (i.e., once the WTRU has acquired the CSG ID of the CSG cell), the WTRU may attempt to connect to a CSG cell even if this CSG does not match any of the CSGs in the WTRUs white list. Described below are embodiments which allow the WTRU to connect to such a cell and embodiments which allow the WTRU to update the white list.

In a first embodiment, once the CSG ID has been read by the WTRU in the SI broadcasted by the HNB, the WTRU may send a location registration request for the HNB to the network. The location registration request may be sent via an uplink direct transfer in UMTS, an ULInformationTransfer in LTE, any other existing RRC message, or a new message, including the CSG ID in the request and, optionally, the PSC/PCI and/or the cell identity, CGI for LTE, of the HNB.

Although the procedure in the first embodiment is not performed from the CSG cell itself, the WTRU, by sending this message, performs a location update as if it is on the CSG cell but without interrupting any ongoing call/session. The location/routing/tracking area update messages have a new update type to indicate that this is for an attempt to access a CSG cell. Moreover, the WTRU may include the CSG ID with respect to which the update is performed. Thus, based on the subscription information/status in the network, the location/routing/tracking area update procedure may be accepted or rejected at 645.

If accepted, a new update result may be used in the accept message that is sent to the WTRU. Moreover, the network may include the CSG ID that it received in the request message. This may allow the WTRU and the network to be sure that the same CSG ID is being referred to 650. The WTRU may then add the ID to its white list and assume that access to the network from that CSG cell may be granted at 655. In addition, the WTRU may first access the cell and then initiate the location/routing/tracking area update procedure on that cell. The WTRU may then add CSG ID to the list once the location update is accepted. The latter location update may follow normal procedures and update types. Also, the WTRU may add the CSG ID to its whitelist and still perform a location/routing/tracking area update provided that it is handed over to the CSG cell.

If the location update is rejected due to an invalid/expired subscription for the WTRU at 645, the network may use a new rejection cause to indicate this to the WTRU at 660. In this case, the WTRU may not consider the location/routing/tracking area as invalid and may not add the location/routing/tracking identity to the list of forbidden area identities.

The WTRU may also be informed whether handover may still be performed without adding the CSG ID to its white list, for example, if the CSG is operating in hybrid mode.

Upon success of the location registration procedure, if the network sent back a location registration accept to the WTRU, the WTRU may add the new CSG ID to its white list and start the handover procedure to this HNB. The fingerprint of the HNB (i.e., location information) may also be stored by the WTRU at the same time it adds the CSG ID to the white list or the fingerprint may be added after successful handover to the HNB. This ensures that the access check performed by the network is verified first and that the WTRU does not store an erroneous fingerprint.

In addition to sending an update message, a new NAS message may be defined to generically provide subscription/status information for other reasons (e.g., whether SIPTO/LIPA, non-packet-switched (PS) services such as short message service (SMS) may be provided from a specific cell) including CSG access. The WTRU may include information such as the services for which it is seeking status information about, for example, CSG access. Based on the response of the network, the WTRU may take further actions such as adding the CSG ID to its white list and attempting handover to that cell.

In a second embodiment, the WTRU may try to connect to the target cell even if the CSG ID does not match. In idle mode, the WTRU may perform cell reselection to the cell. If the cell reselection is successfully completed and the WTRU is not rejected, the WTRU may add the CSG ID to the CSG white list. An exception to this rule may apply provided that an emergency call has been initiated.

In connected mode, the WTRU may send a measurement report indicating that the CSG cell is a non member or send a measurement report with the PCI/PSC measured and the signal quality of the cell using existing signaling or any new signaling procedures. Provided that a handover command is sent in return to the WTRU indicating that the handover should be performed to the target CSG cell, the WTRU may add the CSG ID to the CSG white list.

Therefore, the RRC layer or the access stratum (AS) may update the CSG white list or send the indication to the NAS to add the CSG. If the WTRU had not read the SI of the cell (e.g., if PSC/PCI confusion exists, the network may not ask the WTRU to read the SI of the cell), the WTRU may perform one or a combination of the following to obtain the CSG ID of the cell. The WTRU may perform the handover and then acquire the SI of the cell to obtain the CSG ID. Once the CSG ID is obtained, it may add it to the white list. The network explicitly indicates the CSG ID of the target cell to the WTRU in the handover message and whether it can be added to the white list or treated as a hybrid cell.

The WTRU may also optionally update its fingerprint information as well. Also, the WTRU may perform the handover or cell reselection, yet not autonomously add the CSG ID to the CSG white list. The WTRU may send an indication to the network indicating that the CSG ID of the cell that it is currently connected to is not in the CSG white list. The network may then explicitly update the CSG white list using higher layer signaling.

In another embodiment, once the network detects that the WTRU is attempting to connect to a CSG cell that is not in the white list, the network may send a RRC connection reject to the WTRU. This may allow the WTRU to fall back to idle mode and initiate a manual search. Optionally, a new cause may be added to the RRC connection reject that indicates to the WTRU that it may attempt to connect to the CSG and begin performing a location area update or routing/tracking area update.

If the network does not answer the location registration request from the WTRU, the WTRU sends back a location registration reject, or the WTRU does not perform the handover or is not allowed to reselect to the cell as in the previous embodiments. The network may not answer the request from the WTRU if a timer expires in the WTRU before the location registration accept is received. And, the location registration reject may occur, for example, if the WTRU is not allowed to access the HNB. The WTRU may not add the CSG ID to its white list and may optionally add this CSG ID to a black list. It may also add the corresponding fingerprint to the black list so that it does not try to add this CSG ID to its white list again and/or does not trigger an autonomous search for this cell. An entry in the black list may be valid for a certain period of time to take into account the changes in time of the HNB access authorizations and to allow the WTRU to attempt to add a previously blacklisted HNB in a future period.

After an unsuccessful attempt, the WTRU may try to measure another one of the HNB PSC/PCI, it had detected during the autonomous and manual search. If the HNB PSC/PCI is above a predefined threshold, the WTRU may perform another location registration procedure after a reading of the CSG ID in the SI. The WTRU may also avoid measuring the HNB again and reuse the signal quality of the HNB stored during the autonomous or manual search to verify that it is above a predefined threshold.

A message may be sent to the user to request the user to initiate manual search. The user may then choose to initiate the measurements, if it is aware that it has subscribed to any of the HNBs. If the advertised CSGs or HNB are not in the WTRU's white list, the WTRU may trigger an autonomous search of CSG cells procedure (i.e., 605-660 in FIG. 6), thereby allowing it to connect and add the CSG ID to its white list.

If the network does not allow the HNB registration in connected mode, the WTRU may keep the information until the end of the call. The WTRU may then enter idle mode and register with the HNB cell. If the registration is successful, then the WTRU may update its white list accordingly.

Additionally, the WTRU may notify the user of the failure of the HNB registration in connected mode, so that the user may choose to stop the call on macro cell and manually trigger the registration with the detected HNB.

The capabilities of signaling of WTRU and the network are now described. Not all WTRUs may be capable of adding a new CSG ID to their white list while in connected mode. This capability may be indicated to the network via an existing RRC message, such as the RRC connection request, by adding an information element (IE) (a one bit IE may be sufficient) or via a new message. Also, the WTRU may include the indication in the MS network capability IE that is sent during registration.

Additionally, not all networks may be capable of performing a location registration on a HNB while a WTRU is in connected mode. This network capability may be explicitly signaled by the network to the WTRU with one or a combination of the following implementations.

A new IE may be added in the RRC connection setup or in any other existing RRC message. A new message sent by the network to the WTRU may be defined. A new optional IE may be added in the NAS messages including, but not limited to, a location registration accept/reject message and used by the network provided the WTRU sends a location registration request on a HNB to the network, possibly while in connected mode.

Further, this network capability may be determined implicitly by the WTRU with one or a combination of the following WTRU implementations. After a certain number of location registration requests sent by the WTRU in connected mode for a HNB for which the WTRU receives a location registration reject or after no response at all, the WTRU may determine that the network does not support the capability and may stop sending this type of requests. After any other NAS/RRC message is sent to the network requesting the outcome of registration on a particular CSG cell with no response having been received for a given period of time or for a certain number of tries. After a certain number of gap requests sent by the WTRU to the network for detecting, measuring, or reading the SI are not granted by the network, the WTRU may determine that the network does not support the capability. The gap requests may refer to authorization to use idle periods in the case of DRX, autonomous gaps, or requests for scheduled gaps.

While in idle or connected mode, the WTRU camped on a UTRAN or an Evolved-UTRAN (E-UTRAN) cell already has a context-ID and an existing RRC connection. Therefore, sending a location update may trigger a logical error due to the receiver state, and eventually cause an update of the context-ID.

The following procedures apply to both WTRU idle and connected modes in both UTRAN and E-UTRAN and are aimed to resolve any system logical errors.

In the network capability signaling, the network (i.e., UTRAN or E-UTRAN) may signal the support for the CSG ID background access check in connected and/or idle mode in a SI block sent as the broadcast control channel, paging, or any other existing or new RRC message.

In the UTRAN procedures, after measuring the new CSG/hybrid cell, the WTRU may send a location update, any other existing RRC message, or a new message for the HNB to the network via an uplink direct transfer. If a location update message is used, a special flag may be used to indicate a target CSG ID background access check. If an existing RRC or a new message is used, the flag may be required to inform the HNB about which of the network capability signaling procedure, UTRAN case procedure or E-UTRAN case procedure to follow.

Upon receiving this message, the HNB may use the WTRU registration request message, indicating the new cause target CSG ID background access check to send to the HNB-GateWay (GW). The HNB-GW may be responsible for the WTRU access check procedure. The access check may alternatively be done by the mobile switching center (MSC) or the serving general packet radio service (GPRS) support node (SGSN). This message may contain the following information: WTRU ID, WTRU capabilities, registration cause such as CSG ID background access check, target access check CSG ID, and target access check Cell ID. Also, the WTRU may decide to send a list of multiple measured target access check CSG ID and target access check Cell ID grouped elements.

Upon receiving the WTRU registration request from the HNB with CSG ID background access check cause, the HNB-GW with the above information may be able to perform the target HNB access verification and reply with a WTRU register accept message that will contain the actual context ID of the WTRU as well as the CSG ID.

Additionally, if the HNB-GW does not have a CSG ID that the WTRU requested for background access check in its database, the HNB-GW may reply with a WTRU register reject message, or it may send a message to the HNB management system or core network to resolve the access check. If the access check performed by the HNB-GW returns a negative result, a WTRU register reject message containing the CSG ID may be issued.

If multiple CSG IDs are targeted, the HNB-GW may send a list of allowed CSGs in the WTRU register accept message. If none of the inquired CSG IDs are allowed, it may send the WTRU register reject message with a list of non-allowed CSG IDs. The HNB may send a location update accept or reject based on the received answer from HNB-GW, transferring the entire answer. The WTRU may add to its white list the positively verified access CSG IDs.

For the E-UTRAN procedures in LTE, the CSG access check is performed at the MME level. The HNB-GW has a role of S1 interface concentrator and control as well as user planes multiplexing role. The WTRU may use a ULInformationTransfer. The CSG ID background access check may be required, followed by a list of measured CSG ID and global cell ID parameters.

The ULInformationTransfer message is transparent to the HNB or eNB. However the HNB or eNB may append the cell ID to the message. This message may arrive at the MME over S1 interface encapsulated in the uplink (UL) NAS transport message.

The MME may process the request based on a special procedure involving the following elements that the WTRU may provide in the message: WTRU ID, WTRU capabilities, cause such as CSG ID background access check, target access check CSG ID, and/or target access check Cell ID.

There may be multiple pairs of CSG ID and Global cell IDs that the WTRU measured. After verifying the access, the MME may reply using a downlink (DL) NAS transport message with the allowed/not allowed CSG list. The HeNB may use the DL information transfer message to convey the CSG ID background access results encapsulated by the DL NAS transport message. Upon reception of the DL information transfer message, the WTRU may update its white list accordingly, for example, by adding or removing CSG IDs based on information received.

If the MME does not have in its database the specific CSG access list, it may inquire about the target MME based on the tracking area identity and reply based on the returned message. Also, if the MME does not have knowledge of the CSG access list, it may simply reject the access for a particular CSG ID.

In another embodiment, a method and apparatus are disclosed for cell identity validation failure in handover.

Situations may arise that require a handover of the WTRU from the source HeNB to the other HeNB or cell, which may be referred to as the target cell. The target cell may be a CSG cell, which may include a CSG HeNB or a close mode cell. A CSG cell may be a macro cell. A target CSG cell, which may be a CSG HeNB or CSG macro cell, may need to validate a CSG ID of the WTRU to determine if the WTRU is a member of the CSG that may connect with the target CSG cell. The WTRU may transmit its CSG ID to the source HeNB, which may transmit the WTRU CSG ID to the target CSG cell. The target CSG cell may compare the received CSG ID from the source HeNB with a CSG ID that the target CSG cell is currently broadcasting. The target CSG cell may not accept the transfer if the CSG ID received from the source HeNB is different than the CSG ID being broadcast by the target CSG cell as the validation of the WTRU membership in the CSG would have failed. The attempted handover may also fail as a consequence.

In another embodiment, the source HeNB may transmit the WTRU CSG ID to the MME. The MME may use the WTRU CSG ID to determine if the WTRU is a member of the CSG that may connect with the target CSG cell. The MME may transmit both the WTRU CSG ID and the membership status of the WTRU to the target cell. The target CSG cell may reject the transfer of the WTRU as the membership status validation would have failed and the attempted handover may fail as a consequence.

Among the reasons that the validation may fail at the target CSG cell, one may be if the MME and the target CSG cell are out of synchronization regarding the CSG ID being broadcast by the target CSG cell. For example, the target CSG cell may have a different configuration at the time the MME determines if the WTRU is a member of the target CSG cell's CSG. However, a WTRU reporting a CSG ID for which validation has failed may still be member of the actual CSG ID reported by the target CSG cell.

In an embodiment, when a handover may fail due to a CSG ID mismatch at the target CSG cell, the MME may be informed of the actual CSG ID broadcast by the target CSG cell rejecting the handover. The source MME may update the WTRU membership in the source HeNB and a new attempt to handover using the correct CSG ID may be made.

The embodiments contemplate CSG ID-CGI validation that may focus on synchronizing CSG ID-CGI information within wireless communication network elements inter operating in a network supporting (e)NBs and HeNBs. As indicated previously, should a hybrid cell detect that the CSG ID provided in a handover request may be different than the one the hybrid cell is broadcasting, the hybrid HeNB may still accept the handover request. Alternatively, should the target cell be a CSG cell, the target CSG cell may reject the handover request and the target CSG cell may send back a handover failure message indicating an invalid CSG ID in the cause IE. In an embodiment, the target CSG cell may also include in either the handover failure or the handover request ACK messages the value of the valid CSG ID broadcasted by the target CSG cell so that the network may be synchronized in this regard.

In an embodiment, where the target cell may be a hybrid cell, the hybrid cell may accept a handover request, albeit treating the WTRU as a non-member. Should the WTRU be a member of the new CSG ID broadcast by the target hybrid cell, the MME may update the WTRU membership status through a WTRU context modification message and therefore allow the target hybrid cell to treat the WTRU as a member.

In another embodiment, when the target cell is a CSG cell, and upon receipt of a handover preparation failure indicating a current or valid CSG ID broadcasted by the target CSG cell, the MME may perform a new or updated access check to determine the WTRU membership status. The MME may query an HSS database to determine the membership status of the WTRU in light of the current CSG cell ID. Alternatively, the MME may determine the WTRU membership status based on information stored on the MME. This updated access check may provide the new/current membership status (member or non-member) to the source HeNB in the handover prepallation failure message along with the correct target CSG ID.

Figure 7:
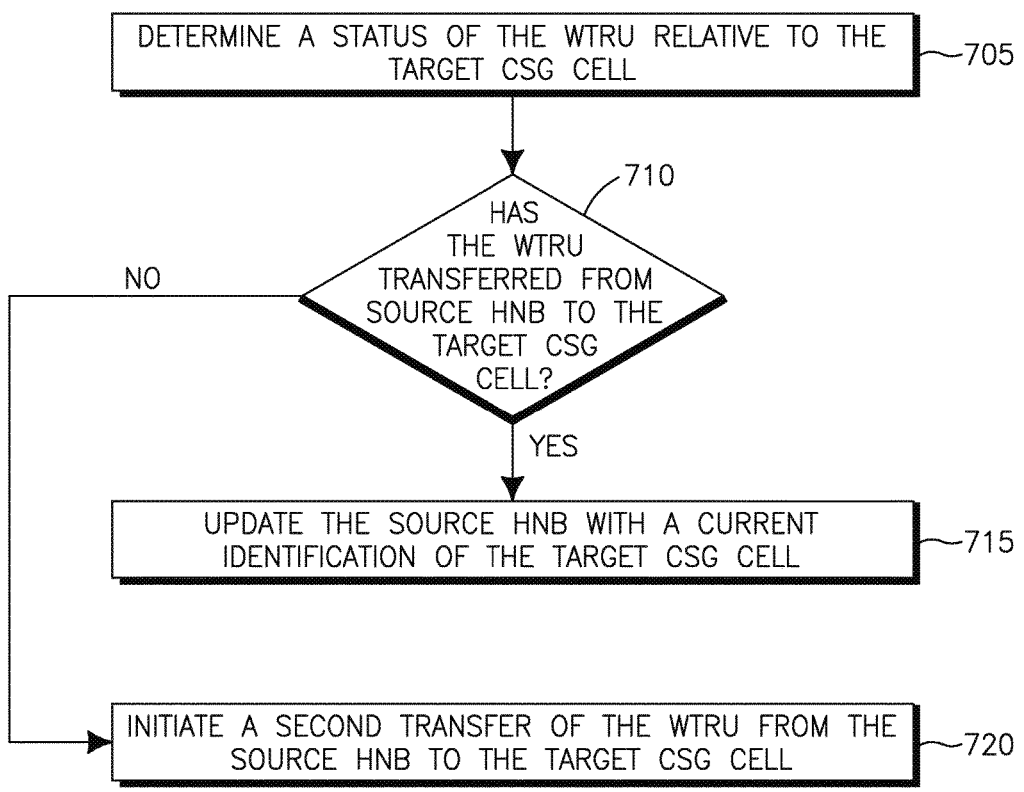
FIG. 7 illustrates a flow diagram of a procedure for to transfer a connection to a CSG node of a communication network in accordance with an embodiment.

Referring to FIG. 7, the MME may determine a status of a mobile device, (i.e., or WTRU), relative to a first network node such as the target CSG cell at 705. The MME may update a second network node, such as the source HeNB with a current identification of the first network node upon failure of a first transfer of the WTRU from the source HeNB to the target CSG cell at 710. On a condition that the first transfer was not successful, the MME may initiate a second transfer of the WTRU from the source HeNB to the target CSG cell at 720. The initiation may be based at least in part on the failure of the first transfer and the status of the mobile device or WTRU. The MME may update the source HNB with a current identification of the target cell at 715, on a condition that the first transfer was a failure.

In another embodiment in which the target cell is a target CSG cell, the target CSG cell may be in communication with a different MME than the MME with which the source HeNB may in communication. This may be referred to as inter-MME. The MME in communication with the target CSG Cell may be referred to as the target MME. The MME in communication with the source HeNB may be referred to as the source MME. The source MME may communicate with the target CSG cell and the target MME may communicate with the source HeNB. In such an embodiment, when the handover preparation failure may be received indicating current (i.e., valid) CSG ID broadcast by the target CSG Cell, the target MME may perform a new or updated access check to determine WTRU membership status (i.e., member or non-member). If the WTRU is a member, the target MME may re-issue a handover request toward the target CSG cell that may include the new CSG ID and the membership status. The target MME may know the target CSG cell identified by the source HeNB for the handover based on the information provided in the previous handover request. This embodiment may be considered to be a by-pass of the source HeNB as the target MME is not acting through the source HeNB to re-issue the handover request.

Upon receiving a successful handover response (i.e., handover request ACK) from the target CSG cell, the target MME may notify, via a forward relocation response, the source MME of the new CSG ID and the membership status. The source MME may then inform the source HeNB of the new CSG ID and the WTRU membership status using a handover command. In an embodiment in which one MME may be in communication with both the target CSG cell and the source HeNB, the MME may function as the source MME and the target MME.

Also, should the re-issued handover request with the new CSG ID result in a failure, upon receiving an unsuccessful handover response via a handover failure message, from the target CSG cell, the target MME may notify the source MME that the handover request has failed for both the previous and new CSG IDS using a forward relocation response-reject. The notification may include the new CSG ID as well as the WTRU membership status.

In another embodiment in which the target cell is a CSG cell, the source MME may perform a new or updated access check to determine WTRU membership status (i.e., member or non-member). If the WTRU is member, the source MME may re-issue a handover request toward the target CSG cell that may include the new CSG ID and the membership status.

Upon receiving a successful handover response (i.e., handover request ACK) from the target CSG cell, the target MME may notify the source MME of the new CSG ID and the membership status using a forward relocation response. The source MME may then inform the source HeNB of the new CSG ID and the WTRU membership status using a handover command.

Should the re-issued handover request with the new CSG ID result in a failure, upon receiving an unsuccessful handover response using a handover failure, from the target CSG cell, the target MME may notify by a forward relocation response-reject, the source MME that the handover request has failed for both the previous and new CSG IDS and include the new CSG ID as well as the WTRU membership status. This embodiment may be considered to be a by-pass of the target MME as the source MME is not acting through the target MME to re-issue the handover request.

In another embodiment, in which the target cell may be a CSG cell and may not be a target MME, the source MME may perform a new or updated access check to determine WTRU membership status (i.e., member or non-member). If the WTRU is member, the source MME may re-issue a handover request toward the target CSG cell that may include the new CSG ID and the membership status.

Upon receiving a successful handover response (i.e., handover request ACK) from the target CSG cell, the source MME may inform the source HeNB of the new CSG ID and the WTRU membership status using a handover command.

Also, should the re-issued handover request with the new CSG ID result in a failure, upon receiving an unsuccessful handover response from the target CSG cell, the source MME may notified of the handover request has failed for both the previous and new CSG IDS and the notification may include the new CSG ID as well as the WTRU membership status using a handover failure.

In another embodiment, in which the target cell is a CSG cell, a HNB-GW may perform the access check and re-initiate the handover toward the target CSG cell. For example, this may be in the case of 3G/UTRAN intra-HNB-GW handover scenario. In other embodiments, the functions described as performed by the one or more MME may be performed by a HNB-GW node, a SGSN node, a GW node, or a MSC node, for example.

In an embodiment in which the target cell is a CSG cell, the source HeNB may receive a handover preparation failure that indicates the current (i.e., valid) CSG ID broadcasted by the target CSG cell. Also, the source HeNB may receive an indication that the MME has determined that the WTRU may be a member of the target CSG cell's CSG. The source HeNB may, in one embodiment, re-attempt the handover. In another embodiment, the re-attempt of the handover may occur after requesting a new set of measurements, which may require the WTRU to read the correct SI. Measurements may include signal attributes that are useful in making a handover decision, such as but not limited to pilot or reference signal strength and/or quality.

In another embodiment, the source HeNB may request the WTRU to read the SI to ensure that the correct CSG ID pair is provided in subsequent proximity indications (e.g., without commanding a new handover).

In another embodiment, the source HeNB may issue a handover command, via a handover required/forward relocation request, toward the target CSG cell for which the correct CSG ID has been received. In another embodiment, the source HeNB may issue a handover command using an RRCConnectionReconfiguration that may include the new CSG ID. For example, as part of the mobilityControlInfo IE, so that the WTRU may modify its own mapping.

In another embodiment, the source HeNB, upon receipt of a handover request ACK message indicating a success, may issue a handover command using an RRCConnectionReconfiguration toward the WTRU. The handover command may include the new CSG ID and an updated member status (e.g., as part of the mobilityControlInfo IE), so that the WTRU may modify its own mapping and/or update its allowed CSG list. For example and for purposes of clarity, a successful handover may occur where the initial WTRU CSG ID is validated by the target CSG cell, where the MME successfully requests the target CSG cell to accept the transfer with the new (i.e., validated) CSG ID, or where the source HeNB initiates a successful handover with the new (i.e., validated) CSG ID.

Figure 8:
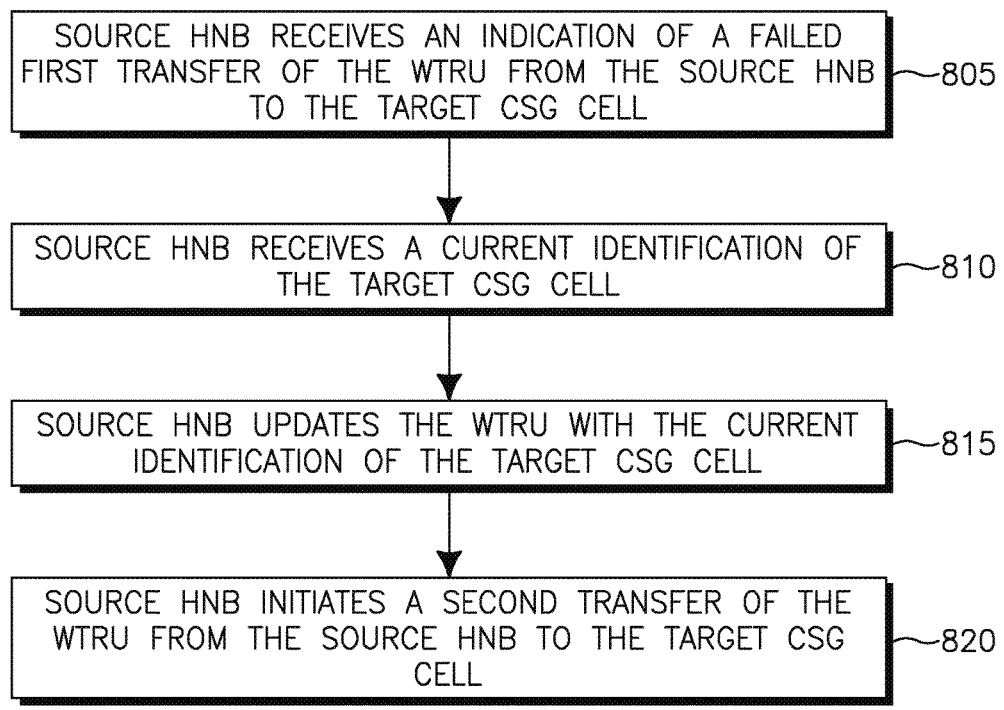
FIG. 8 illustrates a flow diagram of a procedure to transfer a connection to a CSG node of a communication network in accordance with another embodiment.

Referring to FIG. 8, the source HeNB may receive an indication of a failed first transfer of the WTRU from the source HeNB to the target CSG cell at 805. The source HeNB may receive a current identification (i.e., valid or updated CSG ID) of a network node, such as the target CSG cell at 810. The source HeNB may update the WTRU with the current identification (i.e., valid or updated CSG ID) of the target CSG cell at 815. The source HeNB may initiate a second transfer of the WTRU from the source HeNB to the target CSG cell at 820. The initiation may be based at least in part on the current identification (valid CSG ID) and the failed first transfer of the WTRU from the source HeNB to the target CSG cell.

In an embodiment, the WTRU may update its CSG ID mappings (e.g., map to a specific CSG ID with carrier frequency band) should the source HeNB provides the new/corrected target CSG cell ID information in the handover command via a RRCConnectionReconfiguration, for example.

In another embodiment, the WTRU may update CSG ID mappings after acting upon a measurement requests configured through the RRCConnectionReconfiguration message or without receiving a measurement request. In another embodiment, the WTRU may update its allowed CSG list, which includes the identities of CSG cells with which the WTRU may be permitted access.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a WTRU, user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A serving base station configured to serve a wireless transmit/receive unit (WTRU), the serving base station comprising:
    a transmitter configured to transmit an indication, to a WTRU, that the WTRU is in an area that potentially contains at least one closed subscriber group (CSG) cell to which the WTRU is allowed to connect;
    a receiver configured to receive, from the WTRU in response to the transmitted indication, a first measurement report including a physical layer cell identity (PCI) of a target CSG cell detected by the WTRU;
    the transmitter further configured to transmit, in response to the received first measurement report, a message to the WTRU indicating that the WTRU is to read system information (SI) of the target CSG cell;
    the receiver further configured to receive, in response to the transmitted message, a second measurement report for the target CSG cell including information read from the SI; and
    a processor configured to initiate, in response to the received second measurement report, a handover of the WTRU to the target CSG cell.

2. The serving base station of claim 1, wherein the first measurement report includes information from a scan of all frequencies in supported bands.

3. The serving base station of claim 1, wherein the first measurement report includes information from a scan of CSG dedicated frequencies.

4. The serving base station of claim 1, wherein the first measurement report includes information from a scan of frequencies provided to the WTRU by the serving base station.

5. The serving base station of claim 1, wherein the first measurement report indicates that the PCI is an unvisited PCI.

6. The serving base station of claim 1, wherein the second measurement report is included in a radio resource control (RRC) message.

7. The serving base station of claim 1, wherein the indication includes configuration information that includes at least one identifier associated with the at least one CSG cell.

8. The serving base station of claim 1, wherein:
    the receiver is further configured to receive, from the WTRU, a capability indication indicating that the WTRU is configured to connect to CSG cells, and
    in response the received capability indicator, the transmitter is configured to transmit the indication, to the WTRU, that the WTRU is in the area that potentially contains the at least one CSG cell.

9. The serving base station of claim 1, wherein the indication indicates that the at least one CSG cell is potentially proximate to the WTRU based on a location of the WTRU.

10. A method implemented in a serving base station configured to serve a wireless transmit/receive unit (WTRU), the method comprising:
    transmitting an indication, to the WTRU, that the WTRU is in an area that potentially contains at least one closed subscriber group (CSG) cell to which the WTRU is allowed to connect;
    receiving, from the WTRU in response to the transmitted indication, a first measurement report including a physical layer cell identity (PCI) of a target CSG cell detected by the WTRU;
    transmitting, in response to the received first measurement report, a message to the WTRU indicating that the WTRU is to read system information (SI) of the target CSG cell;
    receiving, in response to the transmitted message, a second measurement report for the target CSG cell including information read from the SI; and
    initiating a handover of the WTRU to the target CSG cell.

11. The method of claim 10, wherein the first measurement report includes information from a scan of all frequencies in supported bands.

12. The method of claim 10, wherein the first measurement report includes information from a scan of CSG dedicated frequencies.

13. The method of claim 10, wherein the first measurement report includes information from a scan of frequencies provided to the WTRU by the serving base station.

14. The method of claim 10, wherein the first measurement report indicates that the PCI is an unvisited PCI.

15. The method of claim 10, wherein the second measurement report is included in a radio resource control (RRC) message.

16. The method of claim 10, wherein the indication includes configuration information that includes at least one identifier associated with the at least one CSG cell.

17. The method of claim 10, further comprising:
    receiving a capability indication, from the WTRU, indicating that the WTRU is configured to connect to CSG cells, and
    in response the received capability indicator, transmitting the indication, to the WTRU, that the WTRU is in the area that potentially contains the at least one CSG cell.

18. The method of claim 10, wherein the indication indicates that the at least one CSG cell is potentially proximate to the WTRU based on a location of the WTRU.

19. A wireless transmit/receive unit (WTRU) comprising:
    a receiver configured to receive an indication, from a serving base station, that the WTRU is in an area that potentially contains at least one closed subscriber group (CSG) cell to which the WTRU is allowed to connect;
    a transmitter configured to transmit, in response to the received indication, a first measurement report including a physical layer cell identity (PCI) of a potential CSG cell to the serving base station;
    the receiver further configured to receive, in response to the transmitted first measurement report, a message from the serving base station indicating that the WTRU is to acquire system information (SI) of the potential CSG cell;

at least one processor configured to read information from the acquired SI; and the transmitter further configured to transmit, in response to the received message, a second measurement report for the potential CSG cell including the information read from the acquired SI.

20. The WTRU of claim 19, wherein the receiver further is configured to start, in response to a network triggered event, searching for the at least one CSG cell.

* * * * *

UNITED STATES PATENT AND TRADEMARK OFFICE
CERTIFICATE OF CORRECTION

PATENT NO. : 10,165,481 B2
APPLICATION NO. : 15/255285
DATED : December 25, 2018
INVENTOR(S) : Sylvie Gomes et al.

Page 1 of 1

It is certified that error appears in the above-identified patent and that said Letters Patent is hereby corrected as shown below:

In the Specification

At Column 3, Line 19, after the word "has", delete "began" and insert therefor --begun--.

At Column 3, Line 44, after the word "example", delete "a".

At Column 3, Line 56, after the word "procedure", delete "for".

At Column 22, Line 8, after the word "handover", delete "prepallation" and insert therefor --preparation--.

At Column 22, Line 27, after the word "may", insert --be--.

At Column 22, Line 62, after the word "CSG", delete "IDS" and insert therefor --IDs--.

At Column 23, Line 36, after the word "MME", delete "may notified of" and insert therefor --may be notified that--.

Signed and Sealed this
Seventh Day of May, 2019

Andrei Iancu
*Director of the United States Patent and Trademark Office*